United States Patent [19]

Shimizu

[11] Patent Number: 4,627,051

[45] Date of Patent: Dec. 2, 1986

[54] LOOP NETWORK SYSTEM CONTROLLED BY A SIMPLE CLOCK STATION

[75] Inventor: Hiroshi Shimizu, Tokyo, Japan

[73] Assignee: NEC, Tokyo, Japan

[21] Appl. No.: 824,035

[22] Filed: Jan. 30, 1986

Related U.S. Application Data

[63] Continuation of Ser. No. 558,393, Dec. 5, 1983, abandoned.

[30] Foreign Application Priority Data

| Dec. 3, 1982 | [JP] | Japan | 57-212364 |
| Dec. 3, 1982 | [JP] | Japan | 57-212365 |
| Mar. 30, 1983 | [JP] | Japan | 58-54117 |
| Mar. 31, 1983 | [JP] | Japan | 58-55437 |
| Mar. 31, 1983 | [JP] | Japan | 58-55438 |
| Mar. 31, 1983 | [JP] | Japan | 58-55439 |
| Mar. 31, 1983 | [JP] | Japan | 58-55440 |
| Mar. 31, 1983 | [JP] | Japan | 58-55441 |
| Jul. 8, 1983 | [JP] | Japan | 58-124481 |

[51] Int. Cl.$^4$ .............................................. H04J 3/00
[52] U.S. Cl. ................................. 370/86; 340/825.5; 370/89
[58] Field of Search ...................... 370/86, 89, 90; 340/825.5

[56] References Cited

U.S. PATENT DOCUMENTS

| 3,863,220 | 1/1975 | Osawa et al. | 370/89 |
| 4,042,783 | 8/1977 | Gindi | 370/86 |
| 4,320,502 | 3/1982 | deVeer | 370/89 |
| 4,404,557 | 9/1983 | Grow | 370/86 |
| 4,432,054 | 2/1984 | Okada et al. | 340/825.5 |
| 4,439,763 | 3/1984 | Limb | 340/825.5 |
| 4,454,508 | 6/1984 | Grow | 370/86 |
| 4,459,588 | 7/1984 | Grow | 370/89 |

Primary Examiner—Douglas W. Olms
Assistant Examiner—Curtis Kuntz
Attorney, Agent, or Firm—Sughrue, Mion, Zinn, Macpeak & Seas

[57] ABSTRACT

In a loop network system comprising a plurality of stations connected by a loop-shaped transmission path (38) wherein each station may utilize the transmission path, the improvement wherein the stations are divided into a clock station and node stations between which control and priority functions are distributed. The clock (30) station transmits, to the path at a predetermined period, a synchronization signal block serving to trigger the node stations (31-36) and to define a highest degree of priority for transmission. A trigger signal block is also transmitted from the clock station to the path so as to define a lower degree of priority each time when a transmission right is seized by the clock station within the predetermined period. Each of the node stations transmits a transmission signal block to the path by seizing a transmission right in consideration of the degree of priority indicated by each of the synchronization and the trigger signal blocks. Each transmission right is given to each station when no signal block is present on the path. A pair of token blocks may be used to guarantee communication of the highest degree of priority and communication of lower degree in the predetermined period.

20 Claims, 25 Drawing Figures

LOOP NETWORK SYSTEM CONTROLLED BY A SIMPLE CLOCK STATION

This is a continuation of application Ser. No. 558,393, now abandoned filed 12-5-83.

BACKGROUND OF THE INVENTION

This invention relates to a loop network system comprising a plurality of stations connected by a loop-shaped transmission path so as to carry out unidirectional communication through the transmission path.

In order to improve efficiency in business, attempts have been directed to development of a local area network communication system which is capable of compatibly carrying out a wide variety of communication, such as voice, data, and video communication. More particularly, the network is capable of selectively carrying out a communication of a wide variety. A loop network system is typical of the local area network communication system.

A conventional loop network system of the type described is proposed by Takashi Matsuda et al in Proceeding of National Telecommunications Conference (1981) of IEEE, pp. G1.2.1–G1.2.5, titled "General purpose local network using optical loop highway" and comprises a center terminal unit and a plurality of remote terminal units connected through a loop of an optical fiber to the center terminal unit. Communication is carried out between the units in a time division fashion through a single time slot assigned in each frame for the communication. The conventional system is suitable for synchronous communication, such as voice communication, because each time slot is fixedly kept until completion of the communication. However, the system is not convenient for video communication for which a plurality of time slots are necessary in each frame.

Another loop network system is described by Werner Bux et al in Proceeding of National Telecommunications Conference (1981), pp. A2.2.1–A2.2.6 and comprises a control station and the other stations (to be called node stations) connected by a loop-shaped transmission path of an optical fiber to the control station. Each node station accommodates at least one terminal equipment. With this system, communication is carried out between the stations by the use of a token for controlling access to the transmission path. More specifically, each station is qualified for communication when the token is seized or kept by the station. Each station continues communication during seizure of the token and sends the token downstream through the transmission path. It is therefore possible with this system to transmit a signal block or packet having various lengths and to increase an amount of information to be transmitted between the stations.

Werner et al also describe a method of making such a token carry a degree of priority given to information to be transmitted. This method enables synchronous communication of a voice or audio signal or the like by assigning a higher degree of priority to the synchronous communication as compared with asynchronous communication of, for example, a data signal. In this method, such a voice signal can be transmitted at every predetermined period to the transmission path in preference to the data signal when each node station seizes or acquires a reservation right which is specified by the higher degree of priority to guarantee preferential transmission of a predetermined amount of information.

With this system, each node station should communicate with the control station so as to seize the reservation just prior to transmission of information. Therefore, the control station must have various kinds of functions to monitor traffic on the transmission path, to detect whether or not a reservation right is to be assigned to each node station, and to communicate with each node station. This means that the functions of the system concentrate on the control station and that the control station is intricate in structure. When faults occur in the control station, the whole of the system is adversely affected by the faults.

In addition, each station should not transfer or release the token downstream until a whole signal block which is sent from each station to the transmission path is returned back to the station in question through the transmission path. Otherwise, a downstream one of the stations cannot detect completion of information in the station under consideration even when the token is received at the downstream station. As a result, the efficiency of transmission is objectionably reduced in a network of a high speed transmission.

SUMMARY OF THE INVENTION

It is an object of this invention to provide a loop network system wherein various kinds of functions necessary for the system can be distributed to each station so as to avoid concentration of the functions on a single one of the stations.

It is another object of this invention to provide a loop network system of the type described, which is capable of compatibly carrying out a wide variety of communication.

A loop network system to which this invention is applicable comprises a plurality of stations which are connected by a loop-shaped transmission path for carrying out unidirectional communication through the transmission path when each of the stations seizes a transmission right. According to this invention, the stations are divided into a particular station and other stations. The particular station comprises synchronization signal producing means for producing a succession of synchronization signal blocks to specify a predetermined period and a first kind of priority, trigger signal producing means for producing a trigger signal block within a duration defined by the predetermined period when the particular station seizes the transmission right. The trigger signal block serves to trigger each of the other stations and to specify a second kind of priority different from the first kind of priority. The particular station further comprises sending means for sending the synchronization and the trigger signal blocks to the transmission path. Each of the other stations comprises transmission signal producing means for producing a transmission signal block, storage means for storing the transmission signal block as a stored signal block assigned with a degree of transmission priority, control means operatively coupled to the storage means and responsive to each of the synchronization and the trigger signal blocks received through the transmission path for controlling the storage means to supply the transmission path with the stored signal block by seizing the transmission right in consideration of said degree of transmission priority and the first and the second kinds of priority.

DESCRIPTION OF THE PREFERRED EMBODIMENTS

Figure 1:
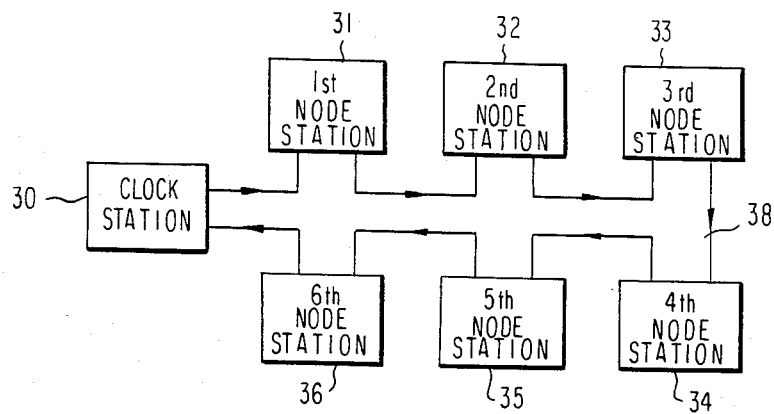
FIG. 1 shows a block diagram for use in describing a loop network system according to each embodiment of this invention.

Referring to FIG. 1, a loop network system according to a first embodiment of this invention comprises a plurality of stations which are equal in number to seven by way of example and a particular one of which will be referred to as a clock station 30 and the remaining ones of which will be referred to as first through sixth node stations 31, 32, 33, 34, 35, and 36, respectively, for convenience of description. Each of the first through the sixth stations 31 to 36 accommodates at least one terminal equipment (not shown in this figure), such as a telephone set, a facsimile apparatus, a data terminal equipment, and/or the like. Such a terminal equipment is operable to produce a succession of transmission data TDS (as will become clear) and to receive a reception signal block transmitted from other terminal equipments of the other stations.

The illustrated system can carry out various communications at different degrees of priority assigned to the respective communications. It is assumed that the highest degree of priority is assigned to synchronous communication and that the lower degrees of priority are assigned to, asynchronous communication. In this connection, the transmission data succession is assigned with a degree of priority which will be referred to as a degree of transmission priority.

The clock and the first through the sixth node stations 30 and 31 to 36 are connected by a transmission path 38 of an optical fiber to one another. When none of the stations 30 to 36 carries out communication, the transmission path 38 forms a loop passing through the respective stations, as will become clear later, and may therefore be called a loop-shaped transmission path. Let the clock station 30 serve to transmit, to the transmission path 38, a synchronization signal block F at a predetermined period $T_0$ and a trigger signal block TG for triggering each of the node stations 31 to 36, in a manner to be described in the following. On the other hand, each of the node stations 31 to 36 is assumed to transmit each transmission data succession TDS to the transmission path 38 as a transmission signal block as will later be described.

Figure 2:
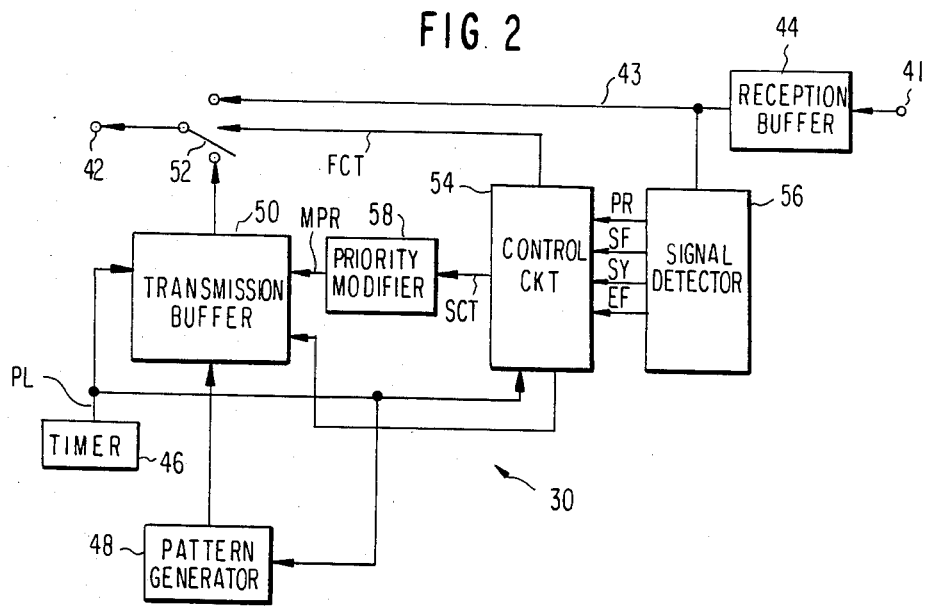
FIG. 2 shows a block diagram of a clock station for use in the loop network system according to the first embodiment of this invention.
Figure 3:
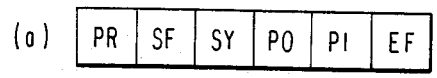
FIG. 3 shows a signal format for use in the loop network system according to the first embodiment.
Figure 3:
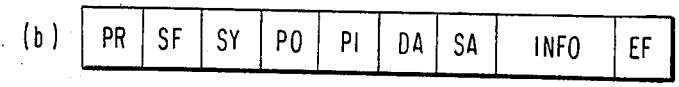

Referring to FIGS. 2 and 3 together with FIG. 1, the clock station 30 comprises input and output terminals 41 and 42 connected to the transmission path 38 illustrated in FIG. 1 on upstream and downstream sides, respectively. An internal transmission path 43 serves as a part of the transmission path 38 together with a reception buffer 44.

The clock station 30 produces a clock station signal block having a signal format as illustrated in FIG. 3(a). The signal format is divided into a preamble area PR, a start flag area SF, a synchronization bit area SY, first and second priority signal areas $P_0$ and $P_1$, and an end flag area EF, which are for arranging a preamble signal of, for example, 8 bits, a start flag, a synchronization bit signal, first and second priority bit signals, and an end flag, respectively. The signal areas and the corresponding signals may often be represented by like reference symbols.

The synchronization signal block F which is produced as the clock station signal block is specified by putting the synchronization bit area SY into a logic "1" level, namely, SY=1 and indicative of the highest degree of priority by rendering the first and the second priority signal areas $P_0$ and $P_1$ into a logic "0" level, namely, $P_0=P_1=0$ which may be referred to as a first-kind priority signal. A logic "1" level signal at the synchronization bit area SY may be called a synchronization signal. The highest degree of priority may be named a first degree of priority or a first kind of priority. Four degrees of priority can be specified by the use of the first and the second priority bit signals and may be called a second kind of priority except the first degree of priority.

In order to send such a synchronization signal block F through the output terminal 42 to the transmission path 38 at the predetermined period $T_0$, the clock station 30 illustrated in FIG. 2 comprises a timer 46 for measuring a duration defined by the predetermined period $T_0$ to produce a single pulse PL each time when the duration lapses, and a pattern generator 48 for generating a pattern signal block similar to the synchronization signal block F except that the pattern signal block takes the logic "0" level at the synchronization bit area SY. A transmission buffer 50 is coupled to the pattern generator 48 and the timer 46 so as to transmit the synchronization signal block to the transmission path 38. The synchronization bit area can be rendered into the logic "1" level in response to the single pulse PL supplied from the timer 46. The reason will become clear as the description proceeds.

The synchronization signal block F is sent from the transmission buffer 50 to the transmission path 38 through a switch 52 and the output terminal 42 under control of a control circuit 54 enabled by the single pulse PL supplied from the timer 46 in a manner to be described later. In FIG. 1, the synchronization signal block F passes through all of the first through the sixth node stations 31 to 36 and is sent back to the clock station 30. In other words, the synchronization signal block F is never captured by each node station 31 to 36 during a travel through the transmission path 38 but serves to trigger each of the first through the sixth node stations 31 to 36. The synchronization signal block F appears as a received synchronization block at the input terminal 41 (FIG. 2) of the clock station 30 after a delay dependent on a length of the transmission path 38. The delay is about 30 microseconds when the length of the transmission path 38 is equal to 5 kilometers. The received synchronization block is sent through the reception buffer 44 to a signal detector 56. The signal detector 56 detects the preamble signal PR, the start flag SF, the synchronization bit signal SY, and the end flag EF from the received synchronization block in a known manner to send them to the control circuit 54. Responsive to the end flag EF attached to the synchronization signal block F, the control circuit 54 knows that the synchronization signal block F is sent back to the clock station 30. In this event, the control circuit 54 supplies a first control signal FCT to the switch 52 so as to connect the internal transmission path 43 to the output terminal 42. As a result, the synchronization signal block F is removed from the transmission path 38 at the clock station 30 after it circulates along the transmission path 38.

After circulation of the synchronization signal block F, each of the first through the sixth node stations 31 to 36 can seize a transmission right in a manner to be described and is put into a state accessible to the transmission path 38, provided that each node station 31 to 36 requests to transmit each transmission signal block at the highest degree of priority and that no other communication is carried out.

The clock station 30 also can seize the transmission right within the predetermined period $T_0$ after control operation is executed to seize the transmission right. Such control operation is possible by monitoring absence of any transmission signal block on the transmission path 38 by the control circuit 54. When the transmission right is seized by the clock station 30, the control circuit 43 supplies a second control signal SCT to a priority modifier 58. Responsive to the second control signal SCT, the modifier 58 produces a modified priority signal MPR for modifying the degree of priority. The priority modifier 58 may be, for example, a counter of two bits.

The modified priority signal MPR has first and second bits corresponding to the first and the second priority signal areas $P_0$ and $P_1$, respectively. The priority modifier 58 at first renders tne first and the second bits of the modified priority signal MPR into the logic "0" and the logic "1" levels, respectively. As a result, the first and the second priority bit signals $P_0$ and $P_1$ are changed from "0" and "0" to "0" and "1," respectively. Thus, the synchronization signal block F stored in the transmission buffer 50 is partially replaced by the modified priority signal MPR into a first trigger signal block $TG_1$ serving to trigger each node station as well as the synchronization signal block F.

As shown in FIG. 3(a), the first trigger signal block $TG_1$ which is also produced as the clock station signal block is similar to the synchronization signal block F except that the first and the second priority bit signals $P_0$ and $P_1$ take the logic "0" and the logic "1" levels in lieu of "0" and "0", respectively, and the synchronization signal bit SY is put into the logic "0" level so as to specify absence of the synchronization signal. A logic "0" level signal at the synchronization signal bit SY may be called a synchronization absence signal. The first trigger signal block is sent from the transmission buffer 5 through the switch 52 to the transmission path 38 under control of the control circuit 54 in the manner described in conjunction with the synchronization signal block F.

Likewise, the clock station 30 supplies the transmission path 38 with second and third trigger signal blocks $TG_2$ and $TG_3$ when the clock station 30 seizes the transmission right within the predetermined period $T_0$ in the above-mentioned manner. The second trigger signal block $TG_2$ has the first and the second priority signal bits $P_0$ and $P_1$ of "1" and "0", respectively, while the third trigger signal block $TG_3$, the bits $P_0$ and $P_1$ of "1" and "1", respectively. The first trigger signal block $TG_1$ specifies a second degree of priority lower than the first degree of priority and higher than a third degree of priority specified by the second trigger signal block $TG_2$ while the second trigger signal block $TG_2$ specifies the third degree of priority higher than a fourth degree of priority specified by the third trigger signal block $TG_3$. Thus, the third trigger signal block $TG_3$ specifies the lowest degree of priority. The first through the third trigger signal blocks carry a second-kind priority signal for specifying a second-kind of priority different from the first-kind of priority.

Anyway, each synchronization signal block F includes the synchronization signal and the first-kind priority signal in the synchronization signal area (SY) and the first and the second priority signal areas ($P_0P_1$), respectively. Each trigger signal block includes the synchronization absence signal and the second-kind priority signal in the synchronization signal area (SY) and the first and the second priority signal areas ($P_0P_1$), respectively.

In FIG. 2, the timer 46 and the pattern generator 48 are operable to produce the synchronization signal block F while the control circuit 54 and the priority modifier 58 are operable to produce the first through the third trigger signal blocks $TG_1$ to $TG_3$ in cooperation with the reception buffer 44 and the signal detector 56. Furthermore, the transmission buffer 50 and the switch 52 serve to send the synchronization signal block F and the trigger signal blocks $TG_1$ to $TG_3$ to the transmission path 38. The first trigger signal block $TG_1$ alone may be transmitted after transmission of the synchronization signal block F. Anyway, each trigger signal block is sent back to the clock station 30 after it circulates along the transmission path 38, as is the case with the synchronization signal block F.

Figure 4:
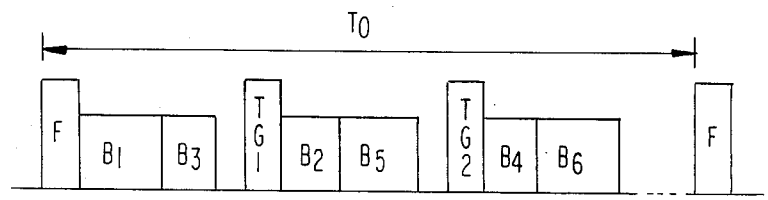
FIG. 4 shows a time chart for use in describing operation of the loop network system according to the first embodiment.

Referring to FIG. 4 together with FIG. 1, it is presumed that the first and the third node stations 31 and 33 request transmission of the first degree of priority and that the second and the fifth node stations 32 and 35, transmission of the second degree of priority. Likewise, let the fourth and the sixth node stations 34 and 36 request transmission of the third degree of priority. The first through the sixth node stations 31 to 36 are assumed to transmit first through sixth transmission signal blocks $B_1$ to $B_6$, respectively, when each request is allowed.

Temporarily referring to FIG. 3(b), each of the first through the sixth transmission signal blocks $B_1$ to $B_6$ has a node station signal block similar to each of the clock station signal blocks (illustrated in FIG. 3(a)) except that a destination address area DA, a sender address area SA, and an information area INFO are placed between the second priority signal area $P_1$ and the end flag EF so as to arrange a destination address signal, a sender address signal, and transmission information, respectively. The destination address signal DA and the sender address signal SA serve to specify a destination address and a sender address assigned to destination and sender stations, respectively. Thus, each transmission signal block includes areas for the destination address signal DA, the sender address signal SA, and the transmission information INFO.

In FIG. 1, when the synchronization signal block F is produced by the clock station 30 and is allowed to successively pass through the first to the sixth node stations 31 to 36 in order, the first node station 31 transmits the first transmission signal block $B_1$ following the synchronization signal block F, as shown in FIG. 4, after reception of the synchronization signal block F. Prior to transmission of the first transmission signal block $B_1$, the first node station 31 carries a control operation to detect whether or not each degree of priority specified by the synchronization signal block F is coincident with that requested by the first node station 31 and to detect whether or not the transmission path 38 is idle, namely, free of any signal blocks. The control operation regarding the degree of priority may be called priority acquisition control operation while the control operation regarding the transmission path may be called the transmission right acquisition control operation.

At any rate, the first transmission signal block $B_1$ following the synchronization signal block F is sent through the transmission path 38 to the second node station 32 requesting transmission of the second degree of priority. As a result of the priority acquisition control operation, the second node station 32 allows the first transmission signal block $B_1$ and the synchronization signal block F to pass therethrough without seizing the transmission right and sends both of the blocks to the third node station 33.

Inasmuch as the third node station 33 requests, transmission of the first degree of priority, the third transmission signal block $B_3$ is sent to the transmission path 38, following the first transmission signal block $B_1$, as a result of the priority acquisition control operation and the transmission right acquisition control operation.

Therefore, a succession of the synchronization signal block F and the first and the third transmission signal blocks $B_1$ and $B_3$ is sent back to the clock station 30 successively through the fourth to the sixth node stations 34 to 36. As illustrated in FIG. 4, the succession lasts a time interval shorter than the predetermined period $T_0$. The synchronization signal block F received at the clock station 30 is removed from the transmission path 38 in the above-mentioned manner and only the first and the third transmission signal blocks $B_1$ and $B_3$ are sent to the transmission path 38.

After removal of the received synchronization signal block F, the clock station 30 is put into operation to seize the transmission right in the afore-mentioned manner. In the example being illustrated, the clock station 30 seizes or acquires the transmission right after passage of the third transmission signal block $B_3$ and sends the first trigger signal block $TG_1$ to the transmission path 38 from the transmission buffer 50 through the switch 52, as mentioned in connection with FIG. 2.

The first trigger signal block $TG_1$ which qualifies transmission of the second degree of priority is given through the first node station 31 to the second node station 32 requesting transmission of the second degree of priority. The second node station 32 sends the second transmission signal block $B_2$ following the first trigger signal block $TG_1$, as shown in FIG. 4, in a manner similar to that illustrated in conjunction with the first node station 31. Likewise, the fifth node station 35 transmits the fifth transmission signal block $B_5$ succeeding the second transmission signal block $B_2$ to the transmission path 38.

The illustrated clock station 30 seizes the transmission right again within the predetermined period $T_0$ to produce the second trigger signal block $TG_2$. As a result, the fourth and the sixth node stations 34 and 36 can transmit the fourth and the sixth transmission signal blocks $B_4$ and $B_6$, as shown in FIG. 4.

Figure 5:
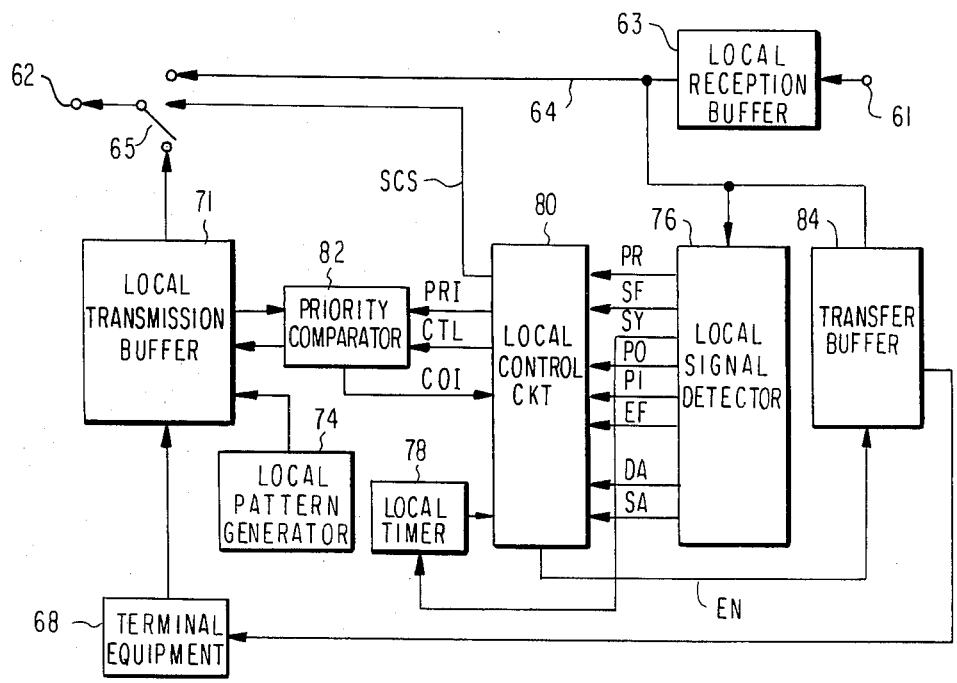
FIG. 5 shows a block diagram of a node station operable in cooperation with the clock station illustrated in FIG. 2.

Referring to FIG. 5, the illustrated node station is typical of the first through the sixth node stations 31 to 36 operable in the above-mentioned manner. The node station has a local input terminal 61 and a local output terminal 62 connected to the transmission path 38 illustrated in FIG. 1. Between the local input and the local output terminals 61 and 62 are connected a local reception buffer 63, a station internal path 64, and a local switch 65 which form a part of the transmission path 38. Each transmission signal block as illustrated in FIG. 4 is sent from the local input terminal 61 to the local output terminal 62 through the local reception buffer 63, the station internal path 64, and the local switch 65 when the illustrated node station carries out no transmission.

The node station is supplied with the transmission data succession from a terminal equipment or equipments depicted at 68. The transmission data succession is assigned with a degree of priority which may be called the degree of transmission priority. The transmission data succession includes the destination and the sender address signals DA and SA in addition to the transmission information INFO and either the first- or the second-kind priority signal and is stored in a local transmission buffer 71. A local pattern generator 74 adds the preamble signal PR, the start flag SF, the synchronization absence signal, and the end flag EF to the transmission data succession so as to form the transmission signal block illustrated in FIG. 3(b).

Supplied with the synchronization signal block F through the local reception buffer 63, a local signal detector 76 detects the synchronization signal specified by SY=1 to reset a local timer 78. The local timer 78 supplies an enable signal to a local control circuit 80.

Responsive to the enable signal, the local control circuit 80 begins to monitor the first and the second priority bit signals $P_0$ and $P_1$ included in the synchronization signal block F or trigger signal blocks $TG_1$ $(1=1,2,000)$ to inform a priority comparator 82 of a degree of received priority in the form of a received priority signal PRI.

When a request for transmission is given from the terminal equipment 68, the priority comparator 82 compares the degree of transmission priority indicated by the transmission data succession with the degree of received priority. When the above-mentioned degrees are coincident with each other, the priority comparator 82 supplies the local control circuit 80 with a coincidence signal COI representative of coincidence of both degrees.

Responsive to the coincidence signal COI, the local control circuit 80 starts the transmission right acquisition control operation carried out by detecting an idle state on the transmission path 38. For this purpose, the local control circuit 80 monitors the end flag EF included in the synchronization signal block F to send a switch control signal SCS to the local switch 65. During production of the switch control signal SCS, the local switch 65 is switched from the station internal path 64 to the local transmission buffer 71. As a result, the preamble signal PR of the transmission signal block which may be called a self-preamble signal is successively transmitted from the local transmission buffer 71 through the local switch 65 to the transmission path 38. When the local signal detector 76 detects, during transmission of the self-preamble signal PR, a preamble signal PR sent from an upstream one of the node stations, the local control circuit 80 interrupts the switch control signal SCS to connect the local switch 65 to the station internal path and to make the local transmission buffer 71 stop transmitting the transmission signal block. Thereafter, the local control circuit 80 monitors first and second priority bit signals $P_0$ and $P_1$ included in a transmission signal block sent from the upstream node station. The above-mentioned operation is repeated on detection of an end flag EF included in the transmission signal block sent from the upstream node station.

When no other preamble signal is detected by the local signal detector 76 during transmission of the self-preamble signal PR, the illustrated node station seizes the transmission right and sends the remaining transmission signal block to the transmission path 38 through the local switch 65. The transmission signal block in question is successively sent back to the node station through the transmission path 38. When the local signal detector 76 detects an end flag EF which is attached to the transmission signal block in question and which circulates along the transmission path 38, the local control circuit 80 interrupts the switch control signal SCS to connect the local switch 65 to the station internal path 64. From this fact, it is readily understood that the transmission path 38 is intercepted during transmission of each transmission signal block at a node station carrying out transmission. As a result, each transmission signal block is removed, after circulation, from the transmission path 38 at the node station which transmitted the above-mentioned transmission signal block.

Similar operation is carried out when a degree of priority other than the first degree of priority is indicated, as by the second-kind priority signal stored in the local transmission buffer 71. In this event, the local control circuit 80 monitors each of the first through the third trigger signal blocks $TG_1$ to $TG_3$ instead of the synchronization signal block F to carry out the priority acquisition control operation and thereafter seizes the transmission right by carrying out the transmission right acquisition control operation.

On receiving a transmission signal block destined for the node station, the local control circuit 80 delivers an enable signal EN to a transfer buffer 84 with reference to the destination address signal DA assigned to the node station and detected by the local signal detector 76. The transfer buffer 84 stores the destined transmission signal block to transmit the same to the terminal equipment 68 in a known manner.

It is readily possible to construct the local signal detector 76 and the local control circuit 80 by combining a plurality of usual logic circuits.

Thus, each of the clock and the node stations releases or loses its transmission right simultaneously with completion of transmission. Therefore, the transmission path 38 can effectively be used by each station.

Although each station starts transmission right acquisition control in each node station when the degree of the received priority (PRI) is coincident with the degree of the transmission priority stored in each transmission buffer 50 or 71, the transmission right aquisition control may also be started in each node station when the degree of transmission priority is higher than the degree of the received priority (PRI). In this event, the priority comparator 82 supplies the local control circuit 80 with a detection signal in place of the coincidence signal COI when the degree of the transmission priority is equal or higher than the degree of the received priority (PRI). Responsive to the detection signal, the local control circuit 80 starts transmission right acquisition control to produce a control signal CTL on seizing the transmission right. The priority comparator 82 allows the priority signal PRI to pass therethrough to the local transmission buffer 71 in response to the control signal CTL. The priority signal PRI is written into the first and the second priority bit signals $P_0$ and $P_1$ of the local transmission buffer 71 and is thereafter sent to the transmission path 38 through the local switch 65. As a result, the degree of transmission priority carried by each transmission signal block is always coincident with the degree of received priority indicated by the synchronization signal block or each of the trigger signal blocks.

Referring to FIGS. 6(a) and 6(b), a signal format of a transmission signal block for use in a loop network system according to a second embodiment of this invention is similar to that illustrated in FIG. 3(a) except that a priority field PI is substituted for the first and the second priority signal areas $P_0$ and $P_1$ illustrated in FIG. 3(b). In FIG. 6(b), the priority field PI is divided into first and second partial areas PIA and PIB each of which is for arranging either the first-kind priority signal or the second-kind priority signal. In other words, each of the first-kind and the second-kind priority signals is arranged twice in the first and second partial areas PIA and PIB.

Figure 6:
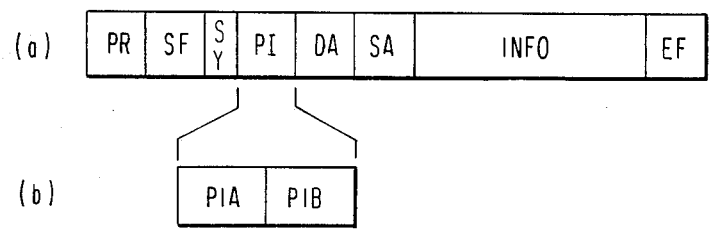
FIG. 6 shows a signal format for use in the loop network system according to the second embodiment of this invention.

Although not shown in FIG. 6, each of the synchronization and the trigger signal blocks F and TG has a signal format similar to that illustrated in FIGS. 6(a) and (b) except that the destination and the sender address signals DA and SA and the transmission information INFO are excluded from each of the synchronization and the trigger signal blocks F and TG. Stated otherwise, each of the synchronization and the trigger signal blocks F and TG includes in duplicate an identical priority signal which may be either the first- or the second-kind priority signal. The synchronization and the trigger signal blocks F and TG can readily be produced by changing the transmission buffer 50 and the priority modifier 58 illustrated in FIG. 2. Therefore, no further description will be made about a clock station for producing the above-mentioned synchronization and trigger signal blocks F and TG.

Figure 7:
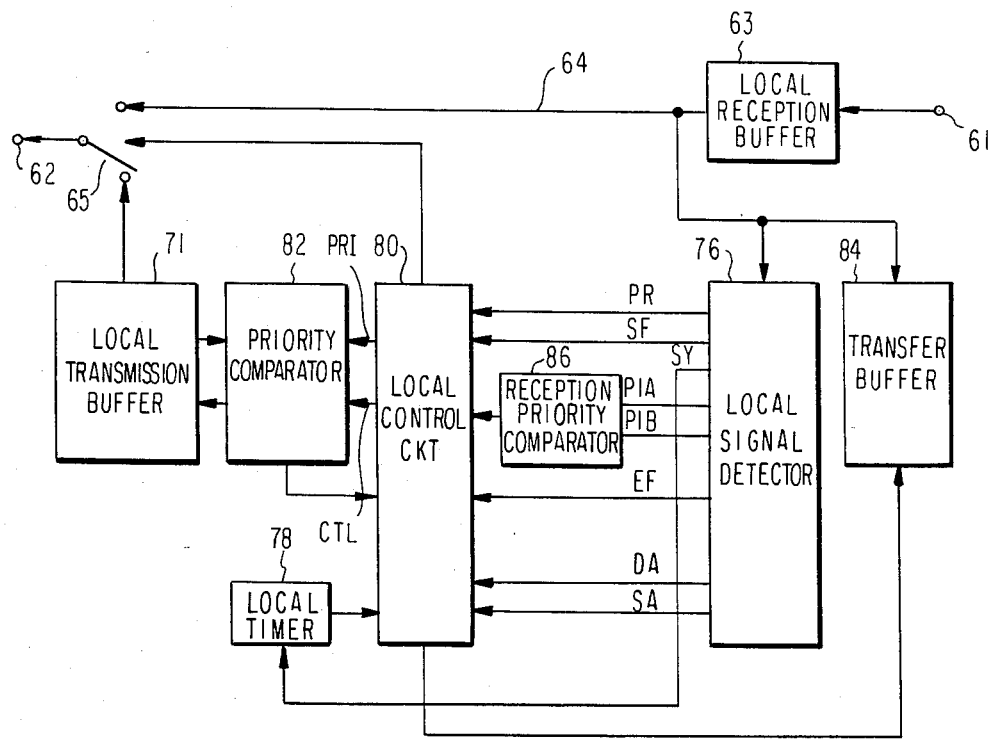
FIG. 7 shows a block diagram of a node station for use in the loop network system according to the second embodiment.

Referring to FIG. 7, the illustrated node station is operable in cooperation with the transmission signal block illustrated in FIG. 6 and is similar to that illustrated in FIG. 5 except for a reception priority comparator 86. Let one of the synchronization and the trigger signal blocks F and TG and the transmission signal block described in conjunction with FIG. 6 be received as a signal block at the illustrated node station. The reception priority comparator 86 is supplied with a pair of received priority signals derived by the local signal detector 76 from the first and the second partial areas PIA and PIB of the signal block. The reception priority comparator 86 compares the received priority signals with each other. When of the received priority signals are coincident with each other, the reception priority comparator 86 supplies either one of the received priority signals to the local control circuit 80. Otherwise, the reception priority comparator 86 selects the one of the received priority signals that indicates a degree of priority higher than the other, to supply the one received priority signal to the local control circuit 80. For example, if the degree of priority indicated by the first partial area PIA is higher than that indicated by the second partial area PIB, the received priority signal in the first partial area PIA is selected by the reception priority comparator 86. Thereafter, the local control circuit 80 carries out control operation to seize the transmission right in the manner described in conjunction with FIG. 5.

With this structure, it is possible to carry out communication by selecting a higher degree of priority even when a transmission error takes place in the received priority signals during the communication.

Figure 8:
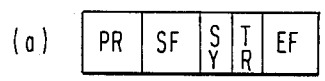
FIG. 8 shows a signal format for use in the loop network system according to the third embodiment of this invention.
Figure 8:
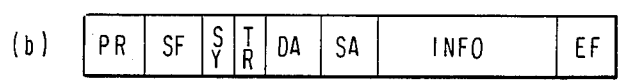
Figure 9:
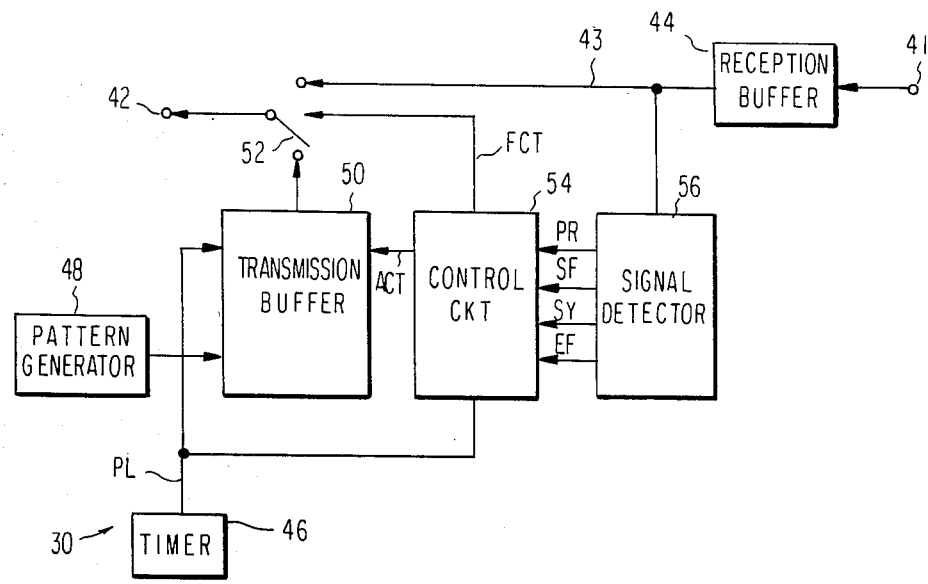
FIG. 9 shows a block diagram of a clock station for use in the loop network system according to the third embodiment of this invention.

Referring to FIGS. 8 and 9, a loop network system according to a third embodiment of this invention is similar to that illustrated in conjunction with FIGS. 1 through 5 except that a clock station 30 produces either a synchronization signal block F or a trigger signal block TG as illustrated in FIG. 8(a) and that each node station 31 to 36 produces a transmission signal block as illustrated in FIG. 8(b).

More specifically, each of the synchronization and the trigger signal blocks F and TG illustrated in FIG. 8(a) is similar to that illustrated in FIG. 3(a) except that a single trigger bit area TR is substituted for the first and the second priority signal areas $P_0$ and $P_1$ shown in FIG. 3(a). The illustrated synchronization signal block F is specified by giving the logic "1" and the logic "0" levels to the synchronization signal bit SY and the trigger bit TR, respectively, while the trigger signal block TG is specified by giving the logic "0" and the logic "1" levels to the synchronization signal bit SY and the trigger bit TR, respectively. It should be noted here that the trigger signal block TG is invariable even when repeated within the predetermined period $T_0$.

Likewise, the transmission signal block illustrated in FIG. 8(b) includes a single trigger bit TR substituted for the first and the second priority signal bits $P_0$ and $P_1$ illustrated in FIG. 3(b). In this event, the transmission signal block is specified by giving the logic "0" level to both of the synchronization signal bit SY and the trigger bit TR. The remaining areas of the illustrated transmission signal block are similar to those illustrated in FIG. 3(b) and are, therefore, not described any further.

Figure 19:
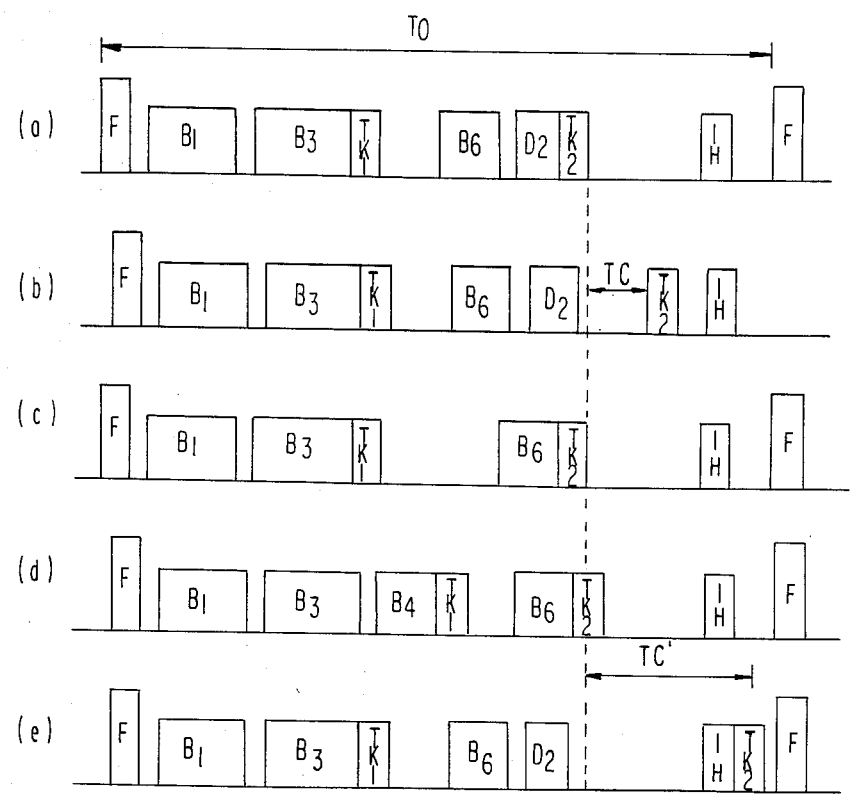
FIG. 19 shows a time chart for use in describing operation of the loop network system according to the seventh embodiment of this invention.

Referring to FIGS. 9 and 19 together with FIG. 8(a), the clock station 30 illustrated in FIG. 9 is similar to that illustrated in FIG. 2 except that the priority modifier 58 shown in FIG. 2 is removed from the clock station 30 illustrated in FIG. 9. Like in FIG. 2, the timer 46 delivers a single pulse PL at the predetermined period $T_0$ to the transmission buffer 50 and the control circuit 54. The transmission buffer 50 puts the priority signal area SY into the logic "1" level in response to the single pulse PL while the control circuit 54 produces the first control signal FCT and an additional control signal ACT in response to the single pulse PL. A logic "1" level signal of the synchronization signal bit SY may be referred to as a synchronization signal. Responsive to the first control signal FCT, the switch 52 is disconnected from the internal transmission path 43 to be switched to connection to the transmission buffer 50. On the other hand, the transmission buffer 50 renders the trigger bit TR into the logic "0" level in response to the additional control signal ACT. Under these circumstances, the synchronization signal block F illustrated in FIG. 8(a) is successively transmitted from the transmission buffer 50 to the transmission path 38 through the switch 52 during production of the first control signal FCT.

Figure 10:
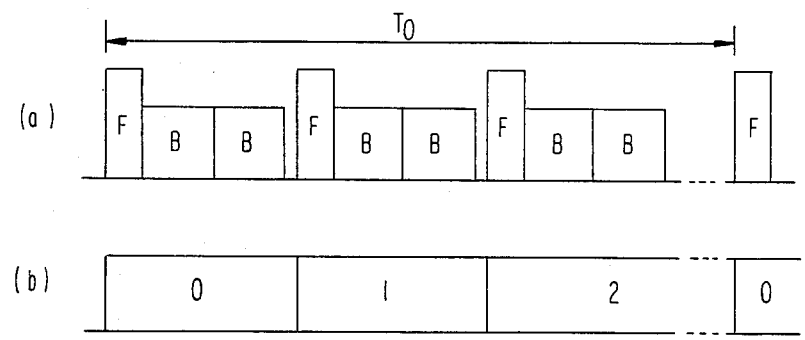
FIG. 10 shows a time chart for use in describing operation of the loop network system according to the third embodiment.

In FIG. 10, the clock station 30 produces two of the trigger signal blocks TG within the predetermined period $T_0$ as a result of seizing the transmission right in the manner described in conjunction with FIG. 2. On production of each trigger signal block TG, the control circuit 54 puts the synchronization signal bit SY and the trigger bit TR into the logic "0" and the logic "1" levels by the use of the additional control signal ACT, respectively, each time when the transmission right is seized by the clock station 30 within the predetermined period $T_0$. A logic "1" level signal of the trigger bit TR may be referred to as a trigger signal. Simultaneously, the control circuit 54 sends the first control signal FCT to the switch 52. Responsive to the first control signal FCT, the switch 52 is connected to the transmission buffer 50 and each trigger signal block TG is transmitted to the transmission path 38, with the synchronization signal bit SY and the trigger bit TR kept at the logic "0" and the logic "1" levels, respectively.

Figure 11:
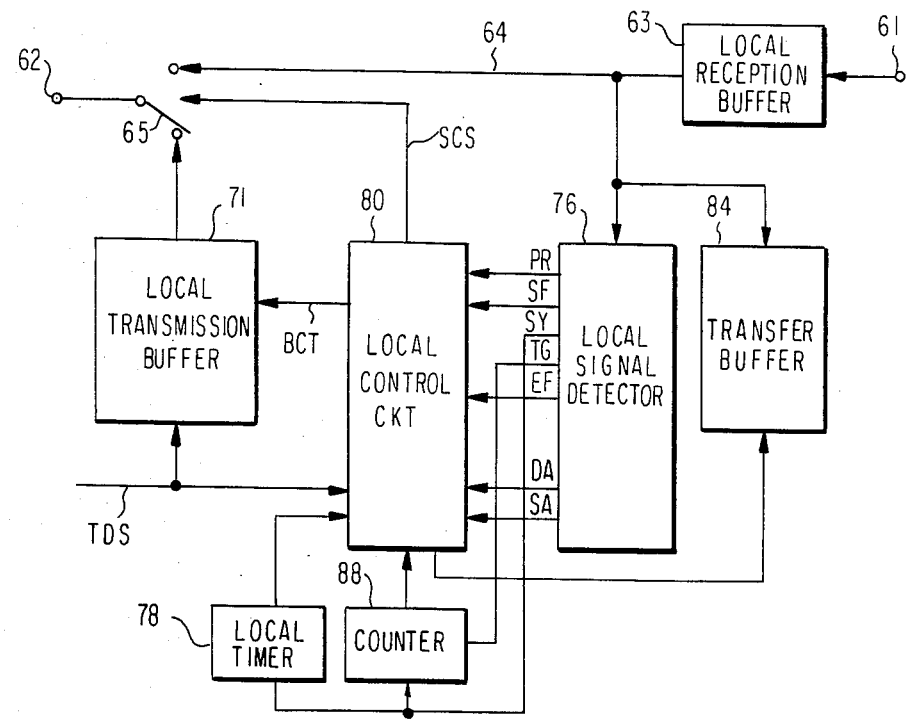
FIG. 11 shows a block diagram of a node station operable in cooperation with the clock station illustrated in FIG. 9.

Referring to FIG. 11 afresh and FIGS. 8 and 10 again, each node station shown in FIG. 11 is operable in response to the synchronization signal blocks F, the trigger signal block TG, and the transmission signal block which are illustrated in FIG. 8. The illustrated node station is similar to that illustrated in FIG. 5 except that the priority comparator 82 illustrated in FIG. 5 is removed from the node station illustrated in FIG. 11 and a counter 88 is put into operation in response to the synchronization signal (SY) and the trigger signal (TR) derived by the local signal detector 76 from the received signal block, such as the synchronization signal block, the trigger signal block, and the transmission signal block.

More particularly, both the timer 78 and the counter 88 are reset in response to the synchronization signal (SY) given from the signal detector 76. The counter 88 is counted up by one each time the trigger signal (TG) is supplied from the local signal detector 76, as shown in FIG. 10(b). If the counter 88 is of two bits, it produces an output signal corresponding to a combination of the first and the second priority signal bits $P_0$ and $P_1$ illustrated in FIG. 3(b). Thus, the counter 88 can indicate a degree of priority by counting the trigger signal (TG), like in FIG. 5. As a result, the local control circuit 80 compares the degree of priority indicated by the counter 88 with a degree of priority given by a transmission data succession (shown at TDS) to detect whether or not both degrees of priority are coincident with each other. The local control circuit 80 carries out the transmission right acquisition control in the above-mentioned manner after detection of coincidence between both of the degrees of priority.

When the transmission right is seized by the node station as a result of the transmission right acquisition control, the local control circuit 80 produces the switch control signal SCS to connect the switch 65 to the local transmission buffer 71. Concurrently, a buffer control signal BCT is supplied to the local transmission buffer 71 to put both of the synchronization signal and the trigger bits SY and TR into the logic "0" level. Thus, the transmission signal block B as shown in FIG. 8(b) is sent from the local transmission buffer 71 to the transmission path 38 with both of the synchronization signal bit SY and the trigger bit TR kept at the logic "0" level.

As shown in FIG. 10(a), each node station can transmit the transmission signal block B with reference to the synchronization signal block F and the trigger signal blocks TG in the abovementioned manner. With this structure, a plurality of degrees of priority can be specified by the use of a single kind of trigger signal without lengthening the length of each signal block.

Figure 12:
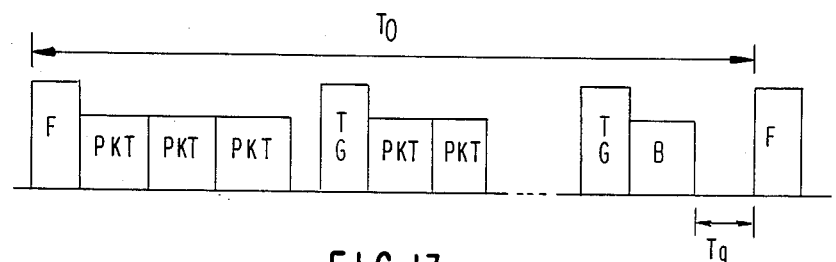
FIG. 12 shows a time chart for use in describing operation of the loop network system according to the fourth embodiment of this invention.

Referring to FIG. 12 afresh and FIG. 11 again, the node station illustrated in FIG. 11 is also applicable to a loop network system according to a fourth embodiment of this invention. As readily understood from the above, the synchronization signal block F is transmitted from the clock station 30 at the predetermined period $T_0$ even when any transmission signal block is passing through the clock station 30. In other words, the synchronization signal block F is produced from the clock station 30 in preference to each transmission signal block. As a result, each transmission signal block is objectionably or undesirably intercepted at the clock station 30 during production of the synchronization signal block F when collision takes place between the synchronization signal block F and each transmission signal block. It is preferable to avoid the collision between the synchronization signal block F and each transmission signal block. For this purpose, the local control circuit 80 illustrated in FIG. 11 monitors the local timer 78 to interrupt transmission of each transmission signal block before lapse of a duration defined by the predetermined period $T_0$.

More particularly, the local control circuit 80 stops the switch control signal SCS even during transmission of a particular transmission signal block (depicted at B in FIG. 12) within a guard time $T_g$ before the duration ($T_0$) lapses. In FIG. 12, the remaining transmission signal blocks are depicted at PKT in order to distinguish between the particular and the remaining transmission signal blocks.

The guard time $T_g$ is determined in consideration of transmission delay time or latency necessary for circulation of each signal block along the transmission path 38.

The guard time $T_g$ may be invariable, if it is sufficiently long in comparison with the transmission delay time. However, the transmission time interval becomes short due to the guard time $T_g$ and the transmission path 38 cannot effectively be utilized.

The transmission delay time becomes long as the transmission path 38 becomes long. The transmission delay time can be defined by a difference between a value of the local timer 78 indicated at the beginning of a transmission signal block and a value thereof indicated on reception of the transmission signal block received through the transmission path 38. If the duration ($T_0$) is divided into a preceding and a following half thereof, such measurement is possible by carrying out preliminary transmission prior to actual or true transmission when each node station seizes the transmission right within, for example, the preceding half of the duration ($T_0$). The guard time $T_g$ may be a sum of the transmission delay time and a spare time. Thus, it is possible to effectively utilize the transmission path 38 by varying the guard time $T_g$ in consideration of the length of the transmission path 38.

During reception operation, the local control circuit 80 monitors the local timer 78 to stop the reception operation for the guard time $T_g$ before the next following synchronization signal block F and to discard any signal block received during the guard time $T_g$.

Similar operation can be accomplished by the use of each node station illustrated in FIGS. 5 and 7.

Figure 13:
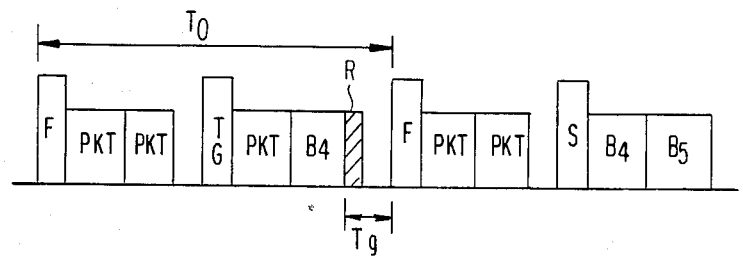
FIG. 13 shows a time chart for use in describing operation of the loop network system according to the fifth embodiment of this invention.

Referring to FIG. 13 together with FIG. 1, description will be made of a loop network system according to a fifth embodiment of this invention. It is assumed that the loop network system illustrated in FIG. 1 carries out communication in the manner described in conjunction with FIGS. 9 to 11 and that the fourth node station 34 carries out transmission of the transmission signal block $B_4$ in response to the trigger signal block TG and interrupts transmission of the transmission signal block $B_4$ with a part of the transmission signal block $B_4$ kept in the fourth node station without transmission. This is because time lapses until the guard time $T_g$, as mentioned in conjunction with FIG. 12. Let the trigger signal block TG specify the second degree of priority lower than the first degree of priority specified by the synchronization signal block F. Furthermore, it is assumed that the fifth node station 35 cannot seize the transmission right, despite the fact that the fifth node station 34 can transmit the transmission signal block $B_5$ following the fourth node station 34 in view of a degree of priority. Any other transmission signal blocks except B$_4$ and B$_5$ are depicted at PKT in FIG. 13.

Under the circumstances, the fourth node station 34 produces a continuation request signal block R during the guard time T$_g$ in a present period T$_0$ as illustrated in FIG. 13 in a manner to be described. The continuation request signal block R is for requesting to continue transmission of the transmission signal block B$_4$ and lasts a time interval shorter than the guard time T$_g$. In this event, the fifth node station 35 produces no continuation request signal block when the continuation request signal block R sent from the fourth node station 34 is detected by the fifth node station 35.

Responsive to the continuation request signal block R received through the transmission path 38, the clock station 30 sends a restart signal block S to the transmission path 38 in the period next following the present period T$_0$, as will later be described. In the example being illustrated, the restart signal block S is substituted in the next following period for a trigger signal block which is to define the second degree of priority in the next following period and which corresponds to the trigger signal block TG in the present period T$_0$.

A transmission right can be acquired with reference to the restart signal block S only by the fourth node station 34 which previously sent the continuation request signal block R. As a result, the fourth node station 34 sends the transmission signal block B$_4$ after the restart signal block S to the transmission path 38. The fifth node station 35 which is placed downstream relative to the fourth node station 34 transmits the transmission signal block B$_5$ following the transmission signal block B$_4$ by regarding the restart signal block S as the trigger signal block TG in a manner to be described later.

Figure 14:
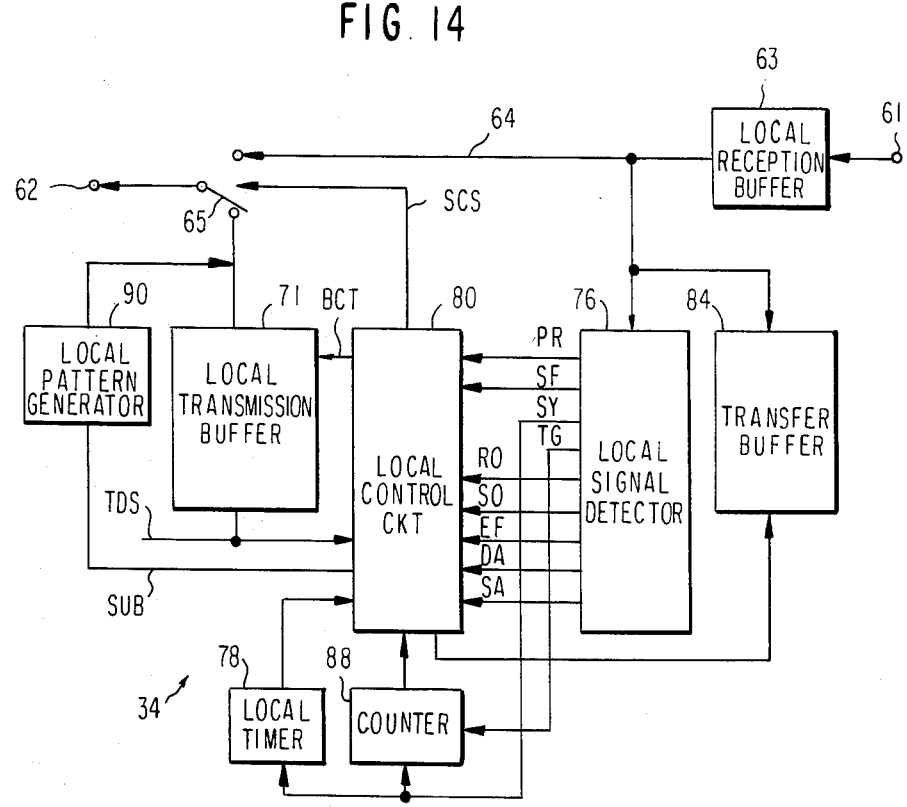
FIG. 14 shows a block diagram of a node station for use in the loop network system according to the fifth embodiment.
Figure 15:
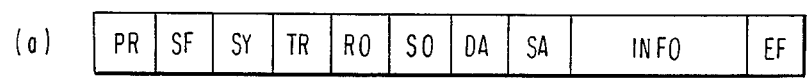
FIG. 15 shows a signal format for use in describing operation of the loop network system according to the fifth embodiment.
Figure 15:
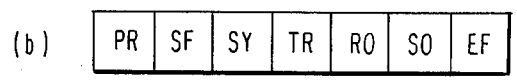

Referring to FIGS. 14 and 15 together with FIG. 13, the fourth node station 34 which is typical of the first through the sixth node stations 31 to 36 comprises similar parts and signals designated by like reference numerals and symbols. The local control circuit 80 monitors the local timer 78 reset in response to the synchronization signal (SY) delivered from the local signal detector 76, like in FIG. 11. After lapse of a time interval equal to a difference between the predetermined period T$_0$ and the guard time T$_g$, the local control circuit 80 supplies a local pattern generator 90 with a subsidiary control signal SUB, if the illustrated node station 34 is transmitting the transmission signal block B$_4$. In this state, the local switch 65 is still connected to the local transmission buffer 71 by presence of the switch control signal SCS.

The local pattern generator 90 produces the continuation request signal block R including a request bit R$_0$ and a restart bit S$_0$, as illustrated in FIG. 15(a). The continuation request signal block R is specified by putting the request and the restart bits R$_0$ and S$_0$ into the logic "1" and the logic "0" levels, respectively. Therefore, no transmission information INFO is included in the continuation request signal block. If the continuation request signal block R can be detected by each node station which has sent the continuation request signal block R, both of the destination and the sender address (DA) and (SA) may not be included in the continuation request signal block R. Otherwise, each of the destination and the sender addresses (DA) and (SA) may be a station address assigned to each node station, namely, the fourth node station 34 which produces the continuation request signal block R.

In addition, both of the synchronization signal bit SY and the trigger bit TR are rendered into the logic "0" level in the continuation request signal block R, like in FIG. 8(b).

Responsive to the subsidiary control signal SUB, the local pattern generator 90 sends the continuation request signal block R to the transmission path 38 through a multiplexer (not shown) and the local switch 65, with the transmission signal block B$_4$ intercepted by the multiplexer. When the continuation request signal block R is sent back from the transmission path 38 to the fourth node station 34, the local control circuit 80 stops the switch control signal SCS and begins to monitor the restart signal block S.

Figure 16:
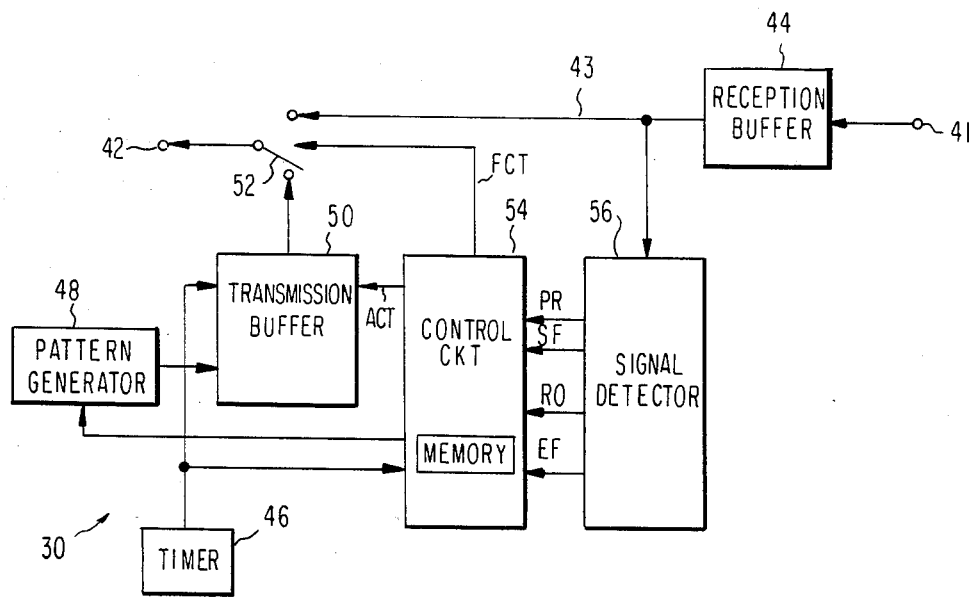
FIG. 16 shows a block diagram of a clock station for use in the loop network system according to the fifth embodiment.

Referring to FIG. 16, together with FIGS. 13 and 15, the clock station 30 illustrated in FIG. 16 is for use in cooperation with the node station as shown in FIG. 14 and produces the synchronization signal block F, the trigger signal block TG, and the restart signal block S as illustrated in FIG. 15(b). A request bit R$_0$ and a restart bit S$_0$ are added to the format illustrated in FIG. 10(a). The synchronization signal block F is specified by putting the synchronization signal bit SY into the logic "1" level. In the synchronization signal block F, all of the trigger, the request, and the restart bits TG, R$_0$, and S$_0$ are rendered into the logic "0" level. The trigger signal block TG is specified by putting the trigger bit TR into the logic "1" level and by putting all of the synchronization signal bit SY, the request bit R$_0$, and the restart bit S$_0$ into the logic "0" level. In the restart signal block S, the restart bit S$_0$ takes the logic "1" level while the synchronization signal bit SY, the trigger bit TG, and the request bit R$_0$ take the logic "0" level. The clock station 30 carries out operation in the manner described in conjunction with FIG. 9 as long as the continuation request signal block R is not detected by the signal detector 56.

Let a request signal specified by R$_0$=1 be delivered from the signal detector 56 as a result of detection of the continuation request signal block R. In this event, the control circuit 54 stores a degree of priority in an internal memory in relation to the continuation request signal block R. Under these circumstances, the control circuit 54 puts the restart bit S$_0$ into the logic "1" level by the use of the additional control signal ACT in the next following period with reference to the degree of transmission priority relating to the continuation request signal block R. The trigger bit TR is simultaneously put into the logic "0" level. Thus, the trigger signal block TG is changed to the restart signal block S which is sent to the transmission path 38 as illustrated in FIG. 13.

The restart bit S$_0$ is monitored by the fourth node station 34 illustrated in FIG. 14. The local control circuit 80 makes the local transmission buffer 71 transmit the transmission signal block B$_4$, provided that a restart signal specified by S$_0$=1 is received after the transmission of the continuation request signal block R. In other words, no transmission right can be seized by reception of the restart signal unless each node station previously transmits the continuation request signal block R to the transmission path 38. This means that the first through the third node stations 31 to 33 cannot seize the transmission right despite the fact that they are placed upstream in relation to the fourth node station.

When the transmission signal block B$_4$ is sent to the transmission path 38, the trigger bit TR of the transmission signal block B$_4$ is changed to the logic "1" level.

Thus, the transmission signal block $B_4$ serves as the trigger signal block.

Figure 17:
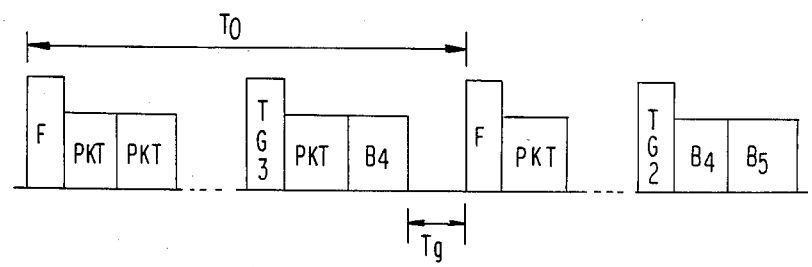
FIG. 17 shows a time chart for use in describing operation of the loop network system according to the sixth embodiment of this invention.

Referring to FIG. 17 afresh and FIGS. 1 and 5 again, a loop network system according to a sixth embodiment of this invention is for use in raising up a degree of transmission priority in each node station when a transmission right cannot be seized in each node station in spite of a transmission request. Let a degree of priority be indicated by the clock station 30 in the manner described in conjunction with FIGS. 4 and 5. Specifically, each degree of priority is indicated by the first and the second priority bits $P_0$ and $P_1$ included in each of the synchronization signal block F and the trigger signal block TG.

It is assumed in FIG. 5 that the local timer 78 of each node station measures a time interval $T_d$ equal to a difference between the predetermined period $T_0$ and the guard time $T_g$ and is timed out after lapse of the time interval $T_d$. In FIG. 1, let both of the fourth and the fifth node stations 34 and 35 offer the transmission requests which indicate the fourth degree of transmission priority. Accordingly, each of the fourth and the fifth node stations 34 and 35 can seize a transmission right when the third trigger signal block $TG_3$ is produced from the clock station 30.

Now, it is assumed that the local timer 78 in the fourth node station 34 is timed out during transmission of the transmission signal block $B_4$ while the fifth node station 35 cannot seize the transmission right owing to lapse of the above-mentioned time interval $T_d$ in spite of the fact that the transmission right acquisition control is carried out.

In FIG. 5, when the illustrated node station is operable as the above-mentioned fourth or fifth node station 34 or 35 which interrupts the transmission or cannot seize the transmission right, the local control circuit 80 monitors the local timer 78 to send a priority modification signal as the control signal CTL to the local transmission buffer 71 through the priority comparator 82. Responsive to the priority modification signal, the local transmission buffer 71 increases by unity the degree of transmission priority indicated by the first and the second priority signal bits $P_0$ and $P_1$. This operation is carried out in both of the fourth and the fifth node stations 34 and 35.

As shown in FIG. 17, both of the fourth and the fifth node stations 34 and 35 cannot appropriately carry out transmission in the present period $T_0$. However, each of the fourth and the fifth node stations 34 and 35 can seize the transmission right by an increment of the degree of priority to produce each of the transmission signal blocks $B_4$ and $B_5$ in order after the second trigger signal block $TG_2$ in the next following period, as shown in FIG. 17.

Such increment control of a degree of priority can be possible in the node station illustrated in FIG. 11. In this event, the local control circuit 80 raises the degree of the transmission priority in the transmission signal block when the local timer 78 is timed out. Such operation may be possible by memorizing the degree of transmission priority included in the transmission data succession and by changing the degree of transmission priority.

Thus, each node station which cannot carry out transmission in the previous period can preferentially carry out transmission in the next following period by the above-mentioned priority control. Accordingly, each node station equally gets opportunity for transmission.

Figure 18:
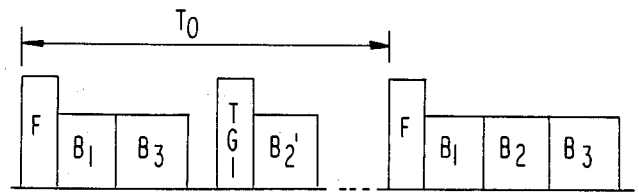
FIG. 18 shows a time chart for use in describing operation in synchronous communication.

Referring to FIG. 18, description will be made of cell control for synchronous communication. It is necessary for the synchronous communication to guarantee periodic transmission. The highest degree of priority is therefore assigned to the synchronous communication. However, synchronization cannot be assured when the total duration occupied by signal blocks transmitted at the degree of priority indicated by the clock station 30 exceeds the duration defined by the period $T_0$. This means that call control is necessary such that the above-mentioned total becomes shorter than the predetermined period $T_0$.

It is presumed that the second node station 32 is about to carry out synchronous transmission of a true transmission signal block $B_2$ having a certain length. For example, a length of the transmission information INFO is given by (64 kb/s$\times T_0$) on transmission of a voice signal of 64 kb/s. Prior to transmission of the transmission signal block $B_2$, the second node station 32 previously transmits a dummy signal block $B_2'$ having a length equal to that of the true transmission signal block $B_2$, at a degree of priority which is lower than the true transmission signal block $B_2$. In FIG. 18, the dummy transmission signal block B' is transmitted at the second degree of priority specified by the first trigger signal block $TG_1$. If such a dummy signal block B' can be transmitted at a lower degree of priority, this means that a total duration occupied by the true transmission signal block $B_2$ and the transmission signal blocks $B_1$ and $B_3$ transmitted at the highest degree of priority is shorter than the period $T_0$. Accordingly, the second node station can carry out transmission at the highest degree of priority. On the other hand, when the second node station 32 detects time-out resulting from lapse of the period $T_0$ during transmission of the dummy signal block, the second node station 32 stops the transmission of the dummy signal block $B_2'$. In this event, the second node station 32 cannot carry out transmission at the highest degree of priority in the next following period. Thus, each node station can individually and independently carry out call control.

Referring to FIG. 19 together with FIG. 1, description will be made about a loop network system according to a seventh embodiment of this invention. In the example being illustrated, the clock station 30 (FIG. 1) produces a synchronization signal block F, a first token block $TK_1$, a second token block $TK_2$, and an inhibit signal block IH. Both of the synchronization signal block F and the inhibit signal block IH are sent back from the clock station 30 through the transmission path 38 (FIG. 1) without being captured by each node station. On the other hand, the first and the second token blocks $TK_1$ and $TK_2$ may often be captured by each node station during transmission of each node station and be sent back to the clock station 30 after transmission of each node station. Therefore, each of the first and the second token blocks $TK_1$ and $TK_2$ is successively delayed in each node station which carries out transmission and finally received by the clock station 30 to be removed thereby.

The first token block $TK_1$ is for indicating first communication of a highest degree of priority, such as synchronous communication, while the second token block $TK_2$ is for indicating second communication of a lower degree of priority, such as asynchronous communication. The first token block $TK_1$ is issued from the clock station 30 immediately after the synchronization signal block F (signals $B_1$ and $B_3$ being described later). The second token block $TK_2$ is issued from the clock station 30 instead of the first token block $TK_1$ after the first token block $TK_1$ is sent back to the clock station 30. Herein, arrival of the first token block $TK_1$ at the clock station 30 varies in relation to a transmission time of each node station, as suggested above. On the other hand, the synchronization signal block F is generated at the predetermined period $T_0$, as mentioned in conjunction with all of the above-mentioned embodiments.

Under the circumstances, the first token block $TK_1$ is not always returned back to the clock station 30 within the predetermined period $T_0$. In other words, the first communication may completely occupy the whole of the predetermined period $T_0$ and the second communication cannot be carried out within the predetermined period $T_0$. This is inconvenient in view of giving equal opportunity to each communication. In order to remove such inconvenience, the inhibit signal block IH is produced from the clock station 30 at a time instant at which a prescribed time interval $T_p$ is shorter than the predetermined period $T_0$. Reception of the inhibit signal block IH enables each node station to carry out the second communication, if each node station requests the second communication. Such an inhibit signal block IH may be produced after a current signal block passes through the clock station 30, if any. Anyway, the inhibit signal block IH is removed from the transmission path 38 when it circulates along the transmission path 38, like the synchronization signal block IH. It is mentioned here that the second token block $TK_2$ may be issued before or after production of the inhibit signal block IH.

In FIG. 1, let the first, the third, and the sixth node stations 31, 33, and 36 already seize, in a current one of the predetermined period $T_0$, the transmission rights which guarantee transmission of the highest degree of priority to carry out the first communication. In addition, let the second and the fourth node stations 32 and 34 be about to carry out the second and the first communications in the current period $T_0$, respectively. It is assumed that the clock station 30 sends to the transmission path 38 the synchronization signal block F followed by the first token block $TK_1$.

Responsive to the synchronization signal block F and the first token block $TK_1$, the first node station 31 allows the synchronization signal block F to pass therethrough. Inasmuch as the first node station 31 requests transmission of the highest degree of priority, the first token block $TK_1$ is captured by the first node station 31 to be kept therein. Instead of transmission of the first token block $TK_1$, the first node station 31 sends a transmission signal block $B_1$ to the transmission path 38. After the transmission signal block $B_1$ is sent to the transmission path 38, the first token block $TK_1$ is also sent to the transmission path 38.

Thus, the third node stations 33 is supplied through the send node station 32 with a combination of the synchronization signal block F, the transmission signal block $B_1$, and the first token block $TK_1$. The third node station 33 adds transmission signal block $B_3$ in the manner described in connection with the first node station 31 after the transmission signal block $B_1$ with the transmission signal block $B_3$ followed by the first token block $TK_1$.

Referring again to FIGS. 1 and 19, the fourth node station 34 is supplied with a succession of the synchronization signal block F, the transmission signal blocks $B_1$ and $B_3$, and the first token block $TK_1$, as illustrated in the lefthand half of FIG. 19(a). In this state, the fourth node station 34 cannot carry out transmission, although it is triggered by the synchronization signal block F. As a result, the above-mentioned succession is sent through the fifth node station 35 to the sixth node station 36 which requests transmission of the highest degree of priority. Like in the first and the third node stations 31 and 33, the sixth node station 36 transmits, to the clock station 30, a transmission signal block $B_6$ followed by the first token block $TK_1$ after detection and removal of the first token block $TK_1$ sent from the third node station 33.

The clock station 30 eliminates the synchronization signal block F from a received signal block succession and substitutes the second token block $TK_2$ for the first token block $TK_1$. The transmission signal block $B_6$ is followed by the second token block $TK_2$ and sent through the first node station 31 to the second node station 32 which is about to carry out the second communication. Responsive to the second token block $TK_2$, the second node station 32 captures and keeps the second token block $TK_2$. The second node station 32 produces a transmission data string (depicted at $D_2$ at FIG. 19(a)) in place of the received second token block $TK_2$. The transmission data string $D_2$ is followed by the second token block $TK_2$ repeated or reproduced at the second node station 32.

As shown in FIG. 19(a), the fourth node station 34 is supplied with a combination of the transmission signal block $B_6$, the transmission data string $D_2$, and the second token block $TK_2$ again in the current period $T_0$. The second node station 32 is about to carry out the first communication specified by the highest degree of priority, as mentioned before, and is assumed to transmit a transmission signal block $B_4$ on acquisition of the transmission right.

Under the circumstances, the second node station 32 captures and keeps the second token block $TK_2$ during a time interval $T_c$ determined in relation to a length of the transmission signal block $B_4$ to be transmitted from the fourth node station 34. Specifically, the time interval $T_c$ which may be called a reservation time interval, as will become clear, is equal to or somewhat longer than a time interval necessary for transmission of the transmission signal block $B_4$.

If the inhibit signal block IH does not arrive at the fourth node station 34 during the reservation time interval $T_c$ as shown in FIG. 19(b), the fourth node station 34 seizes the transmission right specified by the highest degree of priority. Therefore, the fourth node station 34 transmits the transmission signal block $B_4$ in the next following period in a manner illustrated in FIGS. 19(c) and (d). More particularly, the fourth node station 34 is given a succession of signal blocks in the next following period. As shown in FIG. 19(c), an idle time interval which corresponds to the reservation time interval $T_c$ is left after the first token block $TK_1$ so as to arrange the transmission signal block $B_4$. Therefore, the transmission signal block $B_4$ is arranged in the manner described in conjunction with each of the first and the third node stations 31 and 33 and followed by the first token block $TK_1$, as shown in FIG. 19(d).

On the other hand, if a reservation time interval is long as depicted at $T_c'$ (FIG. 19(e)) and the inhibit signal block IH arrives at the fourth node station 34 during the reservation time interval $T_c'$, the fourth node station 34 cannot seize the transmission right. In this event, the second token block TK₂ is issued from the fourth node station 34 after passage of the inhibit signal block IH.

As mentioned before, each node station, such as the second node station 32, carries out the second communication by receiving the second token block TK₂. Such a second communication is guaranteed within each period T₀ by supply of the inhibit signal block IH from the clock station 30. If the second token block TK₂ is kept after passage of the inhibit signal block IH in a transmitting one of the node stations that is carrying out the second communication, the transmitting station continues the second communication after passage of the inhibit signal block IH.

While the inhibit signal block IH passes through each node station during the first communication specified by the highest degree of priority, the first communication is interrupted at a specific one of the node station that transmitted a signal block in relation to the first communication. In this event, an already transmitted part of the signal block is discarded. The signal block interrupted at the specific node station may be repeated in the following period.

Collision between the second communication and the synchronization signal block F can be avoided in the manner described before.

Figure 20:
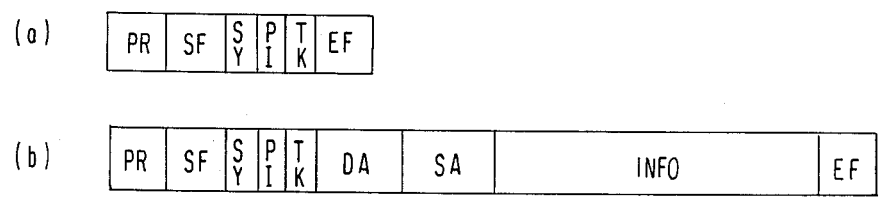
FIG. 20 shows a signal format for use in the loop network system according to the seventh embodiment.

Referring to FIG. 20, each of the synchronization signal block F, the first and the second token blocks TK₁ and TK₂, and the inhibit signal block IH has a clock station format as illustrated in FIG. 20(a). The clock station format is divided into a preamble signal area PR, a start flag area SF, a synchronization signal area SY, and an end flag area EF, like in FIG. 3. A priority area PI and a token area TK are included in the illustrated clock station format, instead of the first and the second priority bits P₀ and P₁. The synchronization signal block F is specified by putting all of the synchronization bit area SY, the priority area PI, and the token area TK into the logic "1" level, namely, $SY = PI = TK = 1$ while the inhibit signal block IH, $SY = TK = 1$ and $PI = 0$. Likewise, the first token block TK₁ is specified by $SY = TK = 0$ and $PI = 1$ while the second token block TK₂, $SY = TK = PI = 0$.

Thus, the priority area PI serves to distinguish between the first and the second token blocks TK₁ and TK₂ while the token area TK serves to distinguish between each of the first and the second token blocks TK₁ and TK₂ and the other signal blocks, such as F and IH. In the example being illustrated, each of the first and the second token blocks TK₁ and TK₂ is specified by putting the token area into the logic "0" level.

In FIG. 20(b), each of node station formats is similar to that illustrated in FIG. 20(a) except that a destination address area and a sender address area are added to the clock station format together with a transmission information area INFO. The transmission information area is for arranging information of 64 T₀ kilobits and 15 T₀ megabits on synchronously carrying out voice and video communications of 64 kilobits/second and 15 megabits/second, respectively. The reservation time interval $T_c$ or $T_c'$ is determined in consideration of the length of information.

Figure 21:
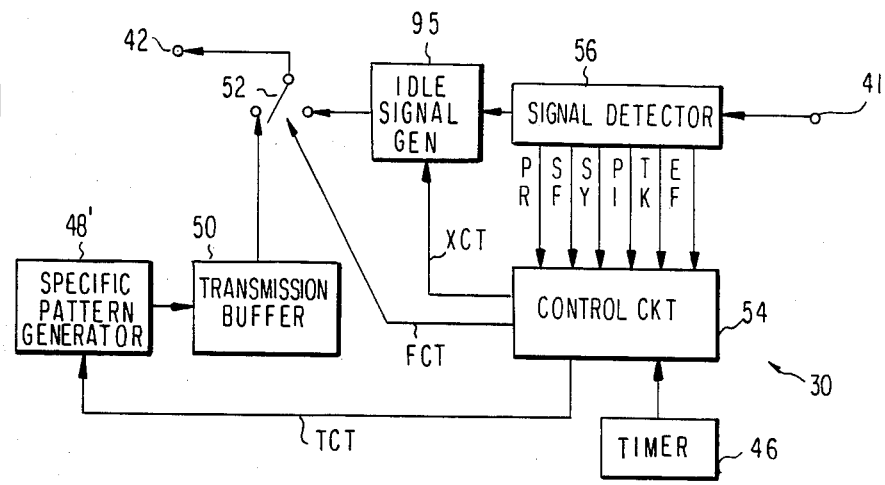
FIG. 21 shows a block diagram of a clock station for use in the loop network system according to the seventh embodiment.

Referring to FIG. 21, the clock station 30 which is illustrated in conjunction with FIGS. 1, 19, and 20 comprises similar parts and signals designated by like reference numerals and symbols. The illustrated clock station 30 further comprises an idle signal supplying circuit 95 operable in cooperation with the signal detector 56 and the control circuit 54 and a specific pattern generator 48' for producing the synchronization signal block F, the inhibit signal block IH, and the first and the second token blocks TK₁ and TK₂ under control of the control circuit 54. The synchronization signal block F is at first stored in the transmission buffer 50 in response to a transfer control signal TCT supplied from the control circuit 54. Like in FIG. 2, the first control signal FCT is sent from the control circuit 54 to connect the switch 52 to the transmission buffer 50. The synchronization signal block F is repeated at the predetermined period T₀ in the manner already described. As a result, the synchronization signal F is sent through the switch 52 and the output terminal 42 to the transmission path 38. After transmission of the synchronization signal block F, the first token block TK₁ is stored in the transmission buffer 50 in response to the transfer control signal TCT to be issued through the transmission path 38, with the switch 52 connected to the transmission buffer 50 by the first control signal FCT. When the first token block TK₁ is issued to the transmission path 38, the switch 52 is connected to the idle signal supplying circuit 95 enabled by an auxiliary control signal XCT produced from the control circuit 54.

When enabled by the auxiliary control signal XCT, the idle signal supplying circuit 95 produces an idle signal having a predetermined pattern. Otherwise, the idle signal producing circuit 95 allows any signal block to pass therethrough. The idle signal supplying circuit 95 may put the output terminal 42 into a quiescent state. At any rate, such an idle signal supplying circuit 95 may be constituted by a known gate circuit.

The signal detector 56 is supplied through the input terminal 41 with the synchronization signal block F sent back to the clock station 30 through the transmission path 38. The signal detector 56 derives signals from the synchronization, the priority, the token, and the end flag areas SY, PI, TK, and EF to deliver these signals to the control circuit 54. The idle signal supplying circuit 95 is disabled after the synchronization signal block F received at the clock station 30 passes through the signal detector 56. In other words, the idle signal supplying circuit 95 is put in an enabled state during passage of the received synchronization signal block F to intercept the received synchronization signal block F. Thus, the received synchronization signal block F is removed from the transmission path 38 after circulation.

When the first token block TK is sent back to the clock station 30, the control circuit 54 makes the specific pattern generator 48' send the second token block TK₂ to the transmission buffer 50. Thereafter, the send token block TK₂ is issued through the transmission buffer 50 and the switch 52 to the transmission path 38 under control of the control circuit 54. In this event, it is possible to render the first token block TK₁ into the second token block TK₂ by changing the priority area P1 from the logic "1" level to the logic "0" level.

The control circuit 54 monitors the timer 46 to time the prescribed time interval $T_p$ and the predetermined period T₀. After lapse of the prescribed time interval $T_p$, the control circuit 54 makes the specific pattern generator 95 transfer the inhibit signal block IH to the transmission buffer 50. The inhibit signal block IH is sent through the switch 52 under control of the control circuit 54 and is removed from the transmission path 38 at the clock station 30 in a manner similar to that described in connection with the synchronization signal block F.

Figure 22:
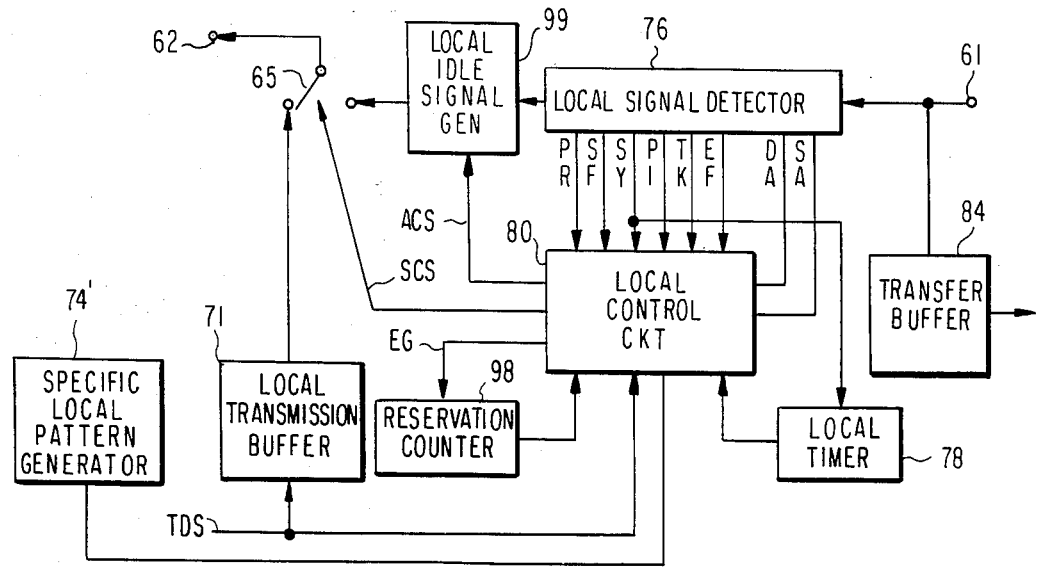
FIG. 22 shows a block diagram of a node station operable in cooperation with the clock station illustrated in FIG. 21.

Referring to FIG. 22, each of the node stations is operable in cooperation with the clock station 30 illustrated in FIG. 21 and comprises similar parts designated by like reference numerals. The illustrated node station further comprises a reservation counter 98 operable in a manner to be described later and a local idle signal generator 99 operable in a manner similar to the idle signal supplying circuit 95 illustrated in FIG. 21. A specific local pattern generator 74' is somewhat different from that illustrated in conjunction with the other figures, as will presently become clear.

Let the first communication be guaranteed in the illustrated node station by the highest degree of transmission priority indicated at the transmission data succession TDS given from the terminal equipment. In this event, the local control circuit 80 produces the switch control signal SCS to connect the local switch 65 to the local transmission buffer 71 when the first token block $TK_1$ is detected by the local signal detector 76. Thus, a transmission signal block which may be called a self-signal block is sent from the local transmission buffer 71 to the transmission path 38 through the local switch 65. In this event, the received first token block $TK_1$ is captured by the illustrated node station and is not sent downstream during transmission. After the self-signal block is wholly sent to the transmission path 38, the local switch 65 is connected to the local idle signal generator 99 which is put into an enabled state by an auxiliary control signal ACS. As a result, the self-signal block is followed by an idle signal produced by the local idle signal generator 99.

When the self-signal block is received at the illustrated node station, the local control circuit 80 puts the local idle signal generator 99 into a disabled state after reception of the received self-signal block. The received self-signal block is removed from the transmission path 38. Consequently, the local control circuit 80 energizes the specific local pattern generator 74' so as to make the generator 74' send the first token block $TK_1$ to the local transmission buffer 71. Thereafter, the first token block $TK_1$ is issued from the local transmission buffer 71 by connecting the local switch 65 to the local transmission buffer 71. The local switch 65 is switched from the local transmission buffer 71 to the local idle signal generator 99 put into the disabled state. Thus, the illustrated node station repeats the first token block $TK_1$.

Let the illustrated node station be about to carry out the first communication specified by the highest degree of priority. When the second token block $TK_2$ is received through the local signal detector 76, the local control circuit 80 puts the local idle signal generator 99 into the enabled state to remove the received second token block $TK_2$ from the transmission path 38. Simultaneously, the local control circuit 80 delivers an energization signal EG to the reservation counter 98. The reservation counter 98 counts a sequence of clock pulses supplied from a clock generator (not shown) in response to an enable signal given from the local control circuit 80. The local control circuit 80 monitors the reservation counter 98 to detect lapse of the reservation time interval $T_c$ illustrated in conjunction with FIG. 19. Such detection is possible by comparing a count of the reservation counter 98 with the bit number of the transmission signal block to be transmitted. After lapse of the reservation time interval $T_3$, the local switch 65 is again connected to the local transmission buffer 71 to send to the transmission path 38 the second token block $TK_2$ given from the specific local pattern generator 74' to the local transmission buffer 71 under control of the local control circuit 80. After the second token block $TK_2$ is sent to transmission path 38, the local switch 65 is connected to the local idle signal generator 99.

When the inhibit signal block IH is received at the node station which keeps the second token block $TK_2$, the local control circuit 80 puts the local idle signal generator 99 into the disabled state. Thus, the inhibit signal block IH passes through the node station.

As mentioned above, the illustrated node station can transmit the transmission signal block in the next following period in the manner described in conjunction with FIG. 19.

Let the illustrated node station carry out the second communication. In this event, a self-signal block is transmitted after the second token block $TK_2$ is captured by the node station, as illustrated in conjunction with the data succession $D_2$ in FIG. 19. The self-signal block is removed from the transmission path 38 after it circulates along the transmission path 38. After removal of the self-signal block, the second token block $TK_2$ is issued from the local transmission buffer 71 in the manner described before. When the inhibit signal block IH is received during transmission, the transmission is interrupted and restarted after passage of the inhibit signal block IH.

Figure 23:
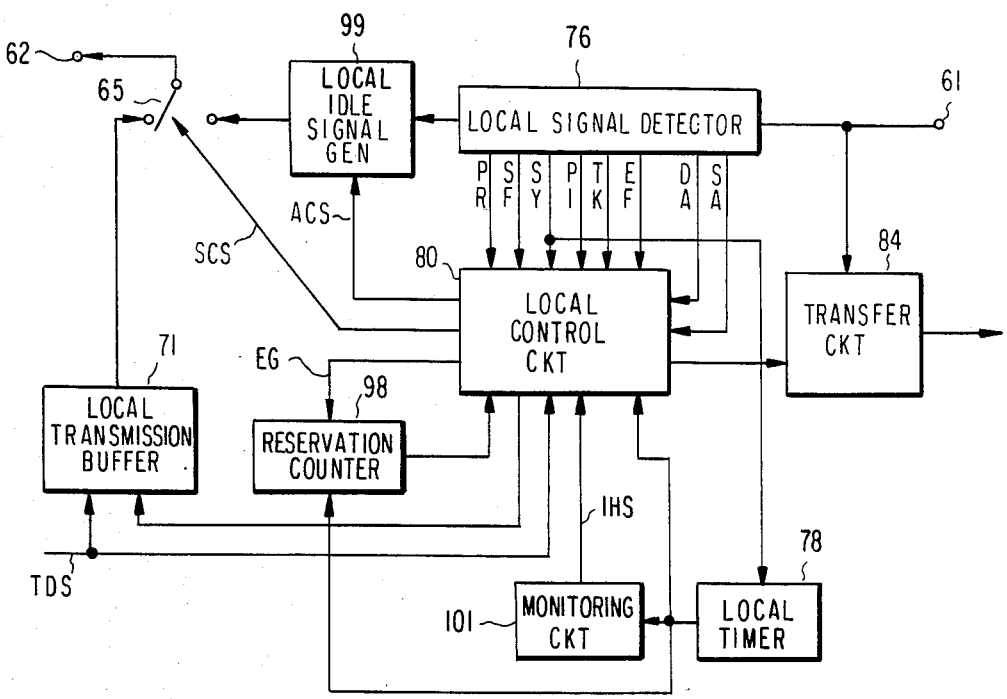
FIG. 23 shows a block diagram of a node station for use in the loop network system according to the eighth embodiment of this invention.

Referring to FIG. 23, a loop network system according to an eighth embodiment of this invention is for internally producing an inhibit signal IHS in each node station as illustrated in FIG. 23. In this connection, no inhibit signal block IH is produced to a clock station used in this embodiment. Such a clock station may comprise a specific local pattern generator which fails to generate the inhibit signal block IH illustrated in conjunction with FIG. 22 and is therefore not described any further.

The illustrated node station is similar to that illustrated in FIG. 22 except that a monitoring circuit 101 is coupled to the local timer 78 reset in response to the signal, namely, the synchronization signal derived from the sychronization area SY by the local signal detector 76. More specifically, the monitoring circuit 101 times the prescribed time interval $T_p$ from a time instant at which the synchronization signal (SY) is received by the illustrated node station. After lapse of the prescribed time interval $T_p$, the monitoring circuit 101 supplies the inhibit signal IHS to the local control circuit 80. As a result, the node station reserves the first communication carried out in the next following period when the inhibit signal IHS is not received during keeping the second token block $TK_2$. On the other hand, the node station cannot reserve the first communication and produces the second token block $TK_2$ kept therein when the inhibit signal IHS is received during keeping the second token block $TK_2$. This operation is similar to that illustrated in conjunction with FIG. 22.

A transmission signal block relating to the second communication and the second token block $TK_2$ may be sent downstream irrespective of the inhibit signal IHS even when collision takes place between the inhibit signal IHS and each of the above-mentioned transmission signal block and the second token block $TK_2$.

Figure 24:
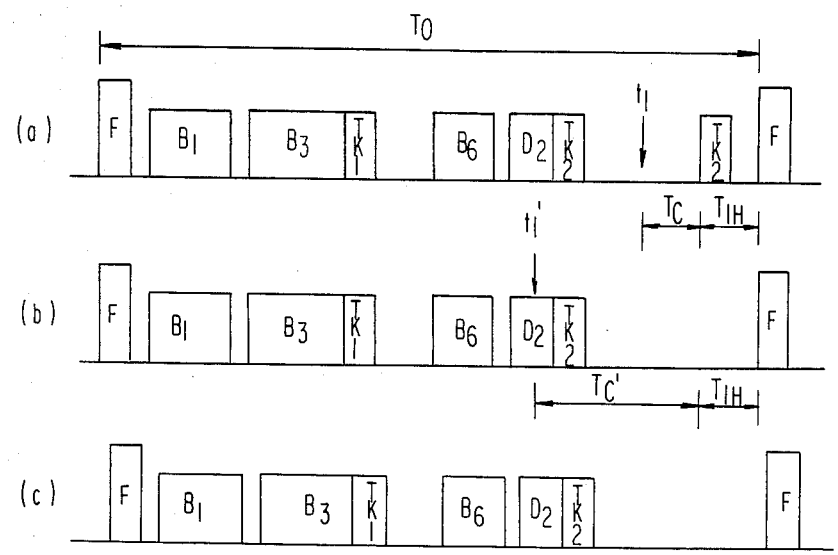
FIG. 24 shows a time chart for use in describing operation of the loop network system according to the ninth embodiment of this invention.

Referring to FIG. 24 afresh and FIG. 1 again, description will be made about a loop network system according to a ninth embodiment of this invention. As is the case with the system according to the seventh embodiment, let the fourth node station 34 be about to reserve the first communication to be carried out in the next following period on the condition described in connection with FIG. 19. In addition, a particular time interval $T_{IH}$ is assumed to be insured for the second communication within each predetermined period $T_0$, as shown in FIG. 24(a). The particular time interval $T_{IH}$ is invariable. This means that the first communication must be carried out during a preselected duration equal to a difference between the predetermined period $T_0$ and the particular time interval $T_{IH}$.

The fourth node station 34 monitors reception of the second token block $TK_2$ with lapse of time measured from reception of the synchronization signal block F. Simultaneously, the reservation time interval $T_c$ is also measured for a transmission signal block to be transmitted in the next following period. The fourth station 34 calculates a sum of the particular time interval $T_{IH}$ and the reservation time interval $T_c$ to subtract the sum from the predetermined period $T_0$ and to define a specific time instant $t_1$ specified by a result of the subtraction.

In FIG. 24(a), the second token block $TK_2$ is received at the fourth node station 34 before the specific time instant $t_1$ in the present period $T_0$. In this event, the first communication is reserved so as to transmit the transmission signal block in the next following period during a duration equal to the reservation time interval $T_c$. After lapse of the reservation time interval $T_c$ in the present period $T_0$, the second token block $TK_2$ is sent to the transmission path 38.

As shown in FIG. 24(b), when the second token block $TK_2$ is not received before the specific time instant (depicted at $t_1'$) due to a long transmission signal block occupying the reservation time interval ($T_c'$), the fourth node station 34 cannot reserve the first communication. Therefore, a received block succession is transmitted as it stands after a delay is provided in the fourth node station 34, as shown in FIG. 24(c).

The clock station 30 used in the above-mentioned system is identical with that described in conjunction with the eighth embodiment and will not be described.

Figure 25:
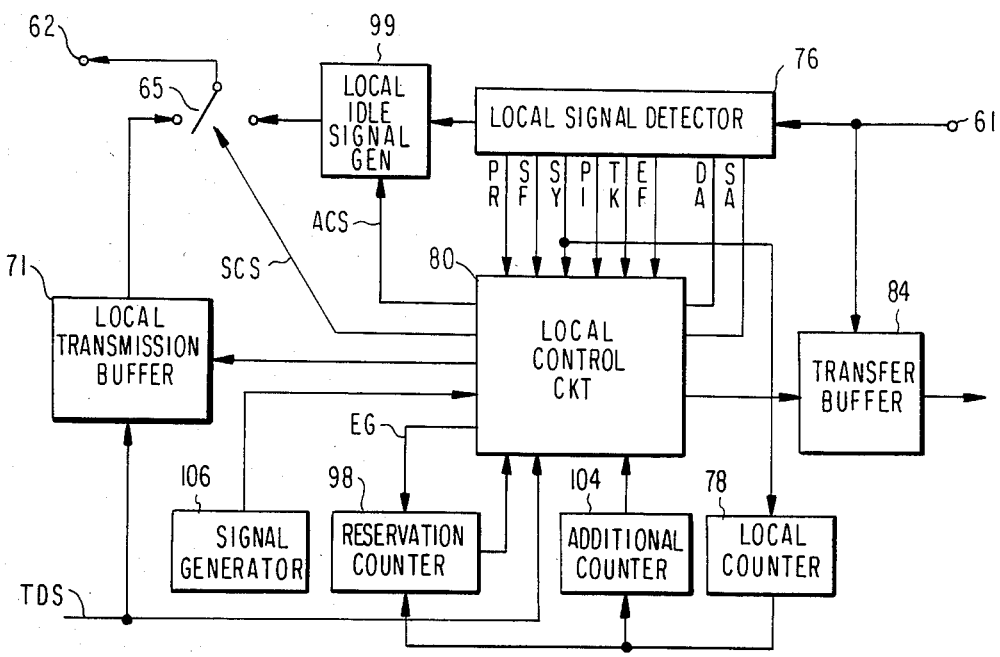
FIG. 25 shows a block diagram of a node station for use in the loop network system according to the ninth embodiment.

Referring to FIG. 25, each node station which is operable in the manner described with reference to FIG. 24 is similar to that illustrated in FIG. 23 except that an additional counter 104 is coupled to the local counter 78 and a signal generator 106 supplies the local control circuit 80 with a time interval signal representative of the particular time interval $I_{IH}$. Like in FIG. 23, the local control circuit 80 is supplied from the reservation counter 98 with a reservation interval signal representative of the reservation time interval $T_c$ and calculates the sum of the reservation time interval $T_c$ and the particular time interval $T_{IH}$ and subtracts the sum from the predetermined period $T_0$ to specify the specific time instant $t_1$ as illustrated in FIG. 24. The additional counter 104 counts the clock pulse sequence in response to the synchronization signal (SY) supplied through the local timer 78 to supply a count to the local control circuit 80. When the second token block $TK_2$ is received at the node station, the local control circuit 80 compares the count with the specific time instant $t_1$ to carry out operation as mentioned before.

In FIGS. 22, 23, and 25, the reservation time interval $T_c$ may be measured by transmitting a dummy signal block which lasts a duration equal to the reservation time interval and which includes, as the destination address DA, an address assigned to the transmitting node station in question. The dummy signal block is removed from the transmission path 38 after circulation. In this event, the reservation counter 98 may be omitted from each node station.

Although both of first and the second token blocks $TK_1$ and $TK_2$ are initially issued from the clock station 30, they may be issued in different manners. For example, the first token block $TK_1$ is always issued from the clock station 30 while the second token block $TK_2$ is issued either from a specific one of the node stations that discards the second token block $TK_2$ during transmission as a result of reception of the synchronization signal block F if such a specific node station is present, or from the clock station if such a specific node station is absent. More particularly, the clock station 30 at first produces the first token block $TK_1$ following the synchronization signal block F and thereafter produces a token request signal block when the first token block $TK_1$ is sent back to the clock station 30 through the transmission path 38. The specific node station captures the token request signal block to carry out the first or the second communication and issues the second token block $TK_2$. In the absence of such a specific node station, the token request block is sent back to the clock station 30. Accordingly, the clock station 30 issues the second token block $TK_2$ in response to the token request signal block sent back to the clock station 30.

The first token block $TK_1$ may be identical with the second token block $TK_2$, if control operation is carried out in the manner described in conjunction with FIG. 10.

While this invention has thus far been described in conjunction with nine embodiments thereof, it will readily be possible for those skilled in the art to put this invention into practice in various manners. For example, the transmission path 38 may form not only a physical loop but also a logical loop wherein each node station is triggered in an order logically predetermined. The clock station 30 may transmit a transmission signal block like each of the node stations. Anyway, the clock station 30 is very simple in structure. In other words, the functions necessary for the system are appropriately distributed to the clock and the node stations.

What is claimed is:

1. In a loop network system comprising a plurality of stations which are connected by a loop-shaped transmission path, said system being for carrying out unidirectional communication through said transmission path when each of said stations seizes a transmission right, the improvement wherein:

said stations are divided into a clock station and node stations;

said clock station comprising:

synchronization signal producing means for producing a succession of synchronization signal blocks to specify a predetermined period and a first kind of priority;

trigger signal producing means for producing a trigger signal block within a duration defined by said predetermined period when said clock station seizes the transmission right, said trigger signal block serving to trigger each of said node stations and to specify a second kind of priority different from said first kind of priority; and selective sending means for selectively sending said synchronization and said trigger signal blocks to said transmission path to select either one of said first and second kinds of priority and to indicate said predetermined period;

each of said node stations comprising:

transmission signal producing means for producing a transmission signal block;

storage means for storing said transmission signal block as a stored signal block assigned with a degree of transmission priority; and control means operatively coupled to said storage means and responsive to each of the synchronization and the trigger signal blocks received through said transmission path for controlling said storage means to supply said transmission path with said stored signal block by seizing the transmission right in consideration of said degree of transmission priority and said first and said second kinds of priority.

2. A loop network system as claimed in claim 1, wherein said first and said second kinds of priority specify a first degree of priority and a plurality of second degrees of priority different from said first degree of priority;

said trigger signal producing means comprising generating means for successively generating a plurality of priority signals which represent the respective second degrees of priority each time when said clock station seizes the transmission right, said priority signals serving to form each trigger signal block;

said control means comprising:

comparing means coupled to said storage means and responsive to the synchronization and the trigger signal blocks received through said transmission path for comparing said degree of transmission priority with each of said first and said second degree of priority; and means for seizing the transmission right when said degree of transmission priority is not lower than each of said first and said second degrees of priority.

3. A loop network system as claimed in claim 2, wherein said first degree of priority is higher than any one of said second degrees of priority.

4. A loop network system as claimed in claim 3, wherein said second degrees of priority are present between a lower degree of priority lower than said first degree of priority and a lowest degree of priority lower than said lower degree of priority, said particular station further comprising:

means for controlling said synchronization signal producing means and said generating means to successively supply said sending means with each of said synchronization signal blocks and said trigger signal blocks in a descending order from said lower degree of priority towards said lowest degree of priority when the transmission right is seized by said control station after production of each synchronization signal block.

5. A loop network system as claimed in claim 1, wherein each of said synchronization signal blocks and said trigger signal blocks includes a synchronization signal part and a priority signal part, each synchronization signal block being specified by arranging a synchronization signal in said synchronization signal part so as to define said predetermined period while each trigger signal block is specified by arranging in the synchronization signal part a synchronization absence signal representative of absence of said synchronization signal, said priority signal part being for arranging a predetermined one of first-kind and second-kind priority signals which are for specifying said first and said second kinds of priority, respectively, said first and said second kinds of priority specifying different degrees of priority.

6. A loop network system as claimed in claim 5, wherein said priority signal area comprises a plurality of parts, each of which is for arranging a preselected one of said first-kind and said second-kind priority signals as said priority signals.

7. A loop network system as claimed in claim 6, wherein said control means comprises:

means for receiving those first- and second-kind priority signals as received priority signals which are sent by said sending means in each synchronization signal block and each trigger signal block, respectively, and received through said transmission path;

means for detecting coincidence of said received priority signals arranged in said partial areas to produce a result of detection; and operation control means for carrying out control operation to seize the transmission right with reference to said result.

8. A loop network system as claimed in claim 7, wherein said operation control means comprises:

means for selecting a highest degree of priority specified by said received priority signals when said result of detection is representative of no coincidence among said received priority signals; and means for seizing the transmission right in accordance with the selected highest degree of priority.

9. A loop network system as claimed in claim 2, wherein said control means further comprises:

means for making said degree of transmission priority coincide with each of the first and the second degress of priority carried by the synchronization and the trigger signal blocks and received through said transmission path when said degree of transmission priority is higher than each of the last-mentioned first and second degrees of priority.

10. A loop network system as claimed in claim 1, wherein:

said trigger signal producing means comprises generating means for repeatedly generating a preselected signal each time when said clock station seizes the transmission right within said duration, each of the preselected signals repeatedly generated by said generating means being sent as said trigger signal block;

said control means comprising:

counter means resettable by the synchronization signal block received through said transmission path for counting the repeatedly produced preselected signals received through said transmission path to produce a count signal representative of said second degree of priority by a count of the last-mentioned preselected signals; and means coupled to said storage means and responsive to each of the synchronization signal blocks received through said transmission path and said count signal for supplying said stored signal block to said transmission path when said degree of transmission priority is concident with either one of said first and said second degrees of priority.

11. A loop network system as claimed in claim 1, wherein said trigger signal producing means comprises:

means for producing for said trigger signal block a token block which specifies a prescribed one of said first and said second kinds of priority and guarantees access to said transmission path;

said control means comprising:

means for capturing the token block received through said transmission path to remove the token block from said transmission path when said degree of transmission priority is coincident with the prescribed degree of priority specified by the token block received at each of said rode stations;

means for supplying the token block to said transmission path after said stored transmission block is transmitted from said storage means to said transmission path.

12. A loop network system as claimed in claim 11, wherein said token block is divided into first and second token blocks specifying said first and said second kinds of priority, respectively, said first and second token blocks being sent to said transmission path;

said control means comprising:

means for measuring a time interval necessary for transmission of the stored transmission block within a current one of said predetermined period to decide whether or not the stored transmission block can be transmitted in said current period to said transmission path when each of said node stations is about to carry out transmission specified by said first kind of priority; and means for performing said transmission in the next following period only when said measuring means decides that the stored transmission block can be transmitted.

13. A loop network system as claimed in claim 12, wherein said measuring means comprises:

dummy block producing means responsive to the second token block received through said transmission path for producing a dummy block which lasts said time interval in said current period; and means for deciding whether or not said dummy block can be transmitted to said transmission path within said current period.

14. A loop network system as claimed in claim 12, wherein said measuring means comprises:

means responsive to the second token block received through said transmission path for keeping the second token block;

means for determining whether or not the second token block is kept during said time interval; and means for energizing said performing means only when the second token block is kept during said time interval.

15. A loop network system as claimed in claim 1, wherein said control means comprises:

means responsive to the synchronization signal block received through said transmission path for measuring lapse for a preselected duration not longer than said predetermined period; and interrupting means for interrupting operation for transmission of said stored signal block in a current one of said predetermined period(s) when said preselected duration lapses after reception of the synchronization signal block received through said transmission path.

16. A loop network system as claimed in claim 15, wherein said preselected duration is equal to either one of said predetermined period(s).

17. A loop network system as claimed in claim 15, wherein said preselected duration is shorter than said predetermined period by a guard time determined in consideration of a length of said transmission path.

18. A loop network system as claimed in claim 15, wherein said control means further comprises:

request signal producing means for producing a request signal indicative of continuation of transmission; and means operable in cooperation with said interrupting means for sending said request signal to said transmission path when said operation is interrupted by said interrupting means;

said clock station comprising:

restart signal producing means for producing a restart signal indicative of restart of transmission; and means responsive to the request signal received through the transmission path in said current period for transmitting said restart signal to said transmission path through said sending means in the next following period.

19. A loop network system as claimed in claim 15, wherein said control means further comprises:

means cooperating with said interrupting means for raising said degree of transmission priority in the next following period when said operation is interrupted.

20. In a loop network system comprising a plurality of stations which are connected by a loop-shaped transmission path for unidirectionally carrying out first communication of a highest degree of priority and second communication of a preselected one of lower degrees of priority through said transmission path when each of said stations seizes a transmission right by the use of a first and a second token block which are for specifying said highest and said lower degrees of priority, respectively, the improvement wherein said stations are divided into a clock station and node stations;

said clock station comprising:

signal supplying means for supplying at a predetermined period a synchronization signal block followed by said first token block to said transmission path; and token control means for carrying out control operation of said second token block to send said second token block to said transmission path after the first token block is sent back to said clock station through said transmission path;

each of said node stations comprising:

transmission signal producing means for producing a transmission signal assigned with a degree of transmission priority representative of one of said highest and said lower degrees of priority;

storage means for storing said transmission signal block accompanied by said degree of transmission priority as a stored signal block;

monitoring means for monitoring the second token block received through said transmission path to measure a time interval to be occupied by said stored signal block when said stored signal block is sent to said transmission path;

detecting means coupled to said monitoring means for detecting whether or not said stored signal block can be transmitted to said transmission path; and providing means coupled to said detecting means for providing said highest degree of priority to carry out said first communication when said stored signal block can be transmitted, said providing means otherwise sending the second token block to said transmission path.

* * * * *

UNITED STATES PATENT AND TRADEMARK OFFICE
CERTIFICATE OF CORRECTION

PATENT NO. : 4,627,051

DATED : December 2, 1986

INVENTOR(S) : Hiroshi Shimizu

It is certified that error appears in the above-identified patent and that said Letters Patent is hereby corrected as shown below:

On the title page assignee should read

-- (73) Assignee: NEC Corporation, Tokyo, Japan --.

Signed and Sealed this

Seventeenth Day of March, 1987

Attest:

DONALD J. QUIGG

Attesting Officer

Commissioner of Patents and Trademarks